US012661585B2

(12) United States Patent
Herling

(10) Patent No.: US 12,661,585 B2
(45) Date of Patent: Jun. 23, 2026

(54) ACCESSING ARTIFICIAL REALITY CONTENT THROUGH A HANDHELD DEVICE

(71) Applicant: Meta Platforms Technologies, LLC, Menlo Park, CA (US)

(72) Inventor: Jan Herling, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 236 days.

(21) Appl. No.: 18/499,776

(22) Filed: Nov. 1, 2023

(65) Prior Publication Data

US 2025/0135338 A1      May 1, 2025

(51) Int. Cl.
*A63F 13/52*        (2014.01)
*A63F 13/65*        (2014.01)
(Continued)

(52) U.S. Cl.
CPC .............. *A63F 13/52* (2014.09); *A63F 13/65* (2014.09); *A63F 13/822* (2014.09); *G06F 3/012* (2013.01); *G06T 15/005* (2013.01); *G06T 15/60* (2013.01); *A63F 2300/6646* (2013.01); *A63F 2300/8082* (2013.01)

(58) Field of Classification Search
CPC ........ A63F 13/52; A63F 13/65; A63F 13/822; A63F 2300/6646; A63F 2300/8082; G06F 3/012; G06T 15/005; G06T 15/60; G06V 40/103; G06V 40/161; G06V 20/20
See application file for complete search history.

(56) References Cited

U.S. PATENT DOCUMENTS 6,842,175 B1   1/2005  Schmalstieg et al.
8,532,675 B1 *  9/2013  Pasquero .......... H04M 1/72457
                                                                    455/418
(Continued)

FOREIGN PATENT DOCUMENTS

CN         105190703 A    12/2015
CN         107209950 A     9/2017
(Continued)

OTHER PUBLICATIONS

Owen Leather, "AR Chat," Jan. 18, 2021, page archived in 2023 and posted in 2021, https://web.archive.org/web/20230329102456/https://devpost.com/software/ar-chat-6akelh (Year: 2021).*
(Continued)

*Primary Examiner* — Kevin Y Kim
(74) *Attorney, Agent, or Firm* — Greenberg Traurig, LLP

(57)        ABSTRACT

In one embodiment, a computing system may determine a device pose of a handheld device in a real-world space based on one or more sensors associated with the handheld device. The system may determine a head pose of a first user associated with the handheld device based on face-tracking data of the handheld device, the head pose being with respect to the handheld device in the real-world space. The system may render a first avatar associated with the first user in a virtual space based on the head pose of the first user in the real-world space. The system may render one or more virtual objects in the virtual space to the first user based on the head pose of the first user in the real-world space.

20 Claims, 13 Drawing Sheets

200A

(51) Int. Cl.
    *A63F 13/822*     (2014.01)
    *G06F 3/01*     (2006.01)
    *G06T 15/00*     (2011.01)
    *G06T 15/60*     (2006.01)

(56) References Cited

U.S. PATENT DOCUMENTS

| | | |
|---|---|---|
| 8,812,954 B2 | 8/2014 | Shuster et al. |
| 9,047,706 B1 | 6/2015 | Ogale |
| 9,323,325 B2 | 4/2016 | Perez et al. |
| 9,814,982 B2 | 11/2017 | Chuaypradit et al. |
| 9,843,772 B2 | 12/2017 | Lee et al. |
| 10,242,476 B2 | 3/2019 | Bastaldo-Tsampalis et al. |
| 10,297,082 B2 | 5/2019 | Wilson et al. |
| 10,304,247 B2 | 5/2019 | King |
| 10,503,351 B2 | 12/2019 | Gullicksen |
| 10,733,800 B2 | 8/2020 | Booth et al. |
| 11,314,376 B2 | 4/2022 | Agarawala et al. |
| 2002/0050988 A1 | 5/2002 | Petrov et al. |
| 2002/0158873 A1 | 10/2002 | Williamson |
| 2008/0015018 A1 | 1/2008 | Mullen |
| 2008/0089577 A1 | 4/2008 | Wang |
| 2009/0219224 A1* | 9/2009 | Elg .......................... H04S 7/304 |
| | | 345/8 |
| 2009/0251465 A1 | 10/2009 | Hassenpflug |
| 2009/0279784 A1 | 11/2009 | Arcas et al. |
| 2010/0245376 A1 | 9/2010 | Bar-Zeev et al. |
| 2010/0315412 A1 | 12/2010 | Sinha et al. |
| 2011/0230263 A1 | 9/2011 | Ng |
| 2012/0001901 A1 | 1/2012 | Park |
| 2012/0069018 A1 | 3/2012 | Yamaya et al. |
| 2012/0142415 A1 | 6/2012 | Lindsay |
| 2012/0194516 A1 | 8/2012 | Newcombe et al. |
| 2012/0249741 A1 | 10/2012 | Maciocci et al. |
| 2012/0263154 A1 | 10/2012 | Blanchflower et al. |
| 2012/0264510 A1 | 10/2012 | Wigdor et al. |
| 2013/0018952 A1 | 1/2013 | McConnell et al. |
| 2013/0050499 A1* | 2/2013 | Siklossy ................. H04W 4/21 |
| | | 348/169 |
| 2013/0083062 A1 | 4/2013 | Geisner et al. |
| 2013/0141418 A1 | 6/2013 | Edholm |
| 2013/0141428 A1 | 6/2013 | Gipson |
| 2013/0196759 A1 | 8/2013 | Kim |
| 2013/0196772 A1 | 8/2013 | Latta et al. |
| 2013/0215230 A1 | 8/2013 | Miesnieks et al. |
| 2013/0225296 A1 | 8/2013 | Kim |
| 2013/0342564 A1 | 12/2013 | Kinnebrew et al. |
| 2014/0071251 A1 | 3/2014 | Nakamura et al. |
| 2014/0136999 A1 | 5/2014 | Leibovich et al. |
| 2014/0218361 A1 | 8/2014 | Abe et al. |
| 2015/0015576 A1 | 1/2015 | Algreatly |
| 2015/0016777 A1 | 1/2015 | Abovitz et al. |
| 2015/0029214 A1 | 1/2015 | Kumagai |
| 2015/0312561 A1 | 10/2015 | Hoof et al. |
| 2015/0348511 A1 | 12/2015 | Oriol et al. |
| 2016/0012157 A1 | 1/2016 | Williams et al. |
| 2016/0026253 A1 | 1/2016 | Bradski et al. |
| 2016/0027215 A1 | 1/2016 | Burns et al. |
| 2016/0093108 A1 | 3/2016 | Mao et al. |
| 2016/0212272 A1 | 7/2016 | Srinivasan et al. |
| 2016/0253844 A1 | 9/2016 | Petrovskaya et al. |
| 2016/0300387 A1 | 10/2016 | Ziman |
| 2017/0269685 A1 | 9/2017 | Marks et al. |
| 2017/0287218 A1 | 10/2017 | Nuernberger et al. |
| 2017/0323482 A1 | 11/2017 | Coup et al. |
| 2017/0326457 A1 | 11/2017 | Tilton et al. |
| 2018/0033208 A1 | 2/2018 | Martin |
| 2018/0095616 A1 | 4/2018 | Valdivia et al. |
| 2018/0096519 A1 | 4/2018 | Tokubo |
| 2018/0114353 A1 | 4/2018 | Champion et al. |
| 2018/0122043 A1 | 5/2018 | Energin et al. |
| 2018/0123813 A1 | 5/2018 | Milevski et al. |
| 2018/0144458 A1 | 5/2018 | Xu et al. |
| 2018/0144547 A1 | 5/2018 | Shakib et al. |
| 2018/0173404 A1 | 6/2018 | Smith |
| 2018/0174367 A1 | 6/2018 | Marom et al. |
| 2018/0225885 A1 | 8/2018 | Dishno |
| 2018/0247446 A1 | 8/2018 | Litvin |
| 2018/0307303 A1 | 10/2018 | Powderly et al. |
| 2019/0197599 A1 | 6/2019 | Zia et al. |
| 2019/0197768 A1 | 6/2019 | Taylor et al. |
| 2019/0311548 A1 | 10/2019 | Wang et al. |
| 2019/0313059 A1 | 10/2019 | Agarawala et al. |
| 2019/0362312 A1 | 11/2019 | Platt et al. |
| 2020/0027194 A1 | 1/2020 | Nourai et al. |
| 2020/0051336 A1 | 2/2020 | Ichikawa et al. |
| 2020/0051338 A1 | 2/2020 | Zia et al. |
| 2020/0066046 A1 | 2/2020 | Stahl et al. |
| 2020/0368616 A1 | 11/2020 | Delamont |
| 2021/0110560 A1 | 4/2021 | Knorr et al. |
| 2021/0134000 A1 | 5/2021 | Malisiewicz et al. |
| 2021/0233303 A1 | 7/2021 | Takahashi |
| 2021/0382544 A1 | 12/2021 | Butcher et al. |
| 2024/0371112 A1 | 11/2024 | Rao et al. |

FOREIGN PATENT DOCUMENTS

| | | |
|---|---|---|
| CN | 108604118 A | 9/2018 |
| CN | 106951882 B | 3/2021 |
| EP | 3945486 A1 | 2/2022 |
| JP | 2019518261 A | 6/2019 |

OTHER PUBLICATIONS

Office Action mailed Mar. 14, 2024 for Chinese Application No. 201980093248.8, filed Feb. 14, 2019, 6 pages.

Popovic M., et al., "Grasping Unknown Objects Using an Early Cognitive Vision System for General Scene Understanding," IEEE-RSJ International Conference on Intelligent Robots and Systems, 2011, 8 Pages.

Coster; "The Effects of Shadows on Depth Perception in Augmented Reality on a Mobile Device," Degree Project in Computer Science and Engineering, Royal Institute of Technology, School of Electrical Engineering and Computer Science (EECS), Apr. 24, 2019, 16 pages.

International Search Report and Written Opinion for International Application No. PCT/US2019/017947, mailed Nov. 28, 2019, 17 Pages.

Irawati; et al., "Spatial Ontology for Semantic Integration in 3D Multimodal Interaction Framework," VRCIA, Hong Kong, ACM, Jun. 14-17, 2006, p. 129-135.

Office Action mailed Jun. 28, 2024 for Chinese Application No. 201910105998.4, filed Jan. 18, 2019, 6 pages.

International Search Report and Written Opinion for International Application No. PCT/US2024/044987, mailed Feb. 10, 2025, 15 pages.

* cited by examiner

100A

Camera 105A

Camera 105B

Headset 104

Controller 106

User 102

Computer 108

100B

200B

220B

210B

211

212

300G

400

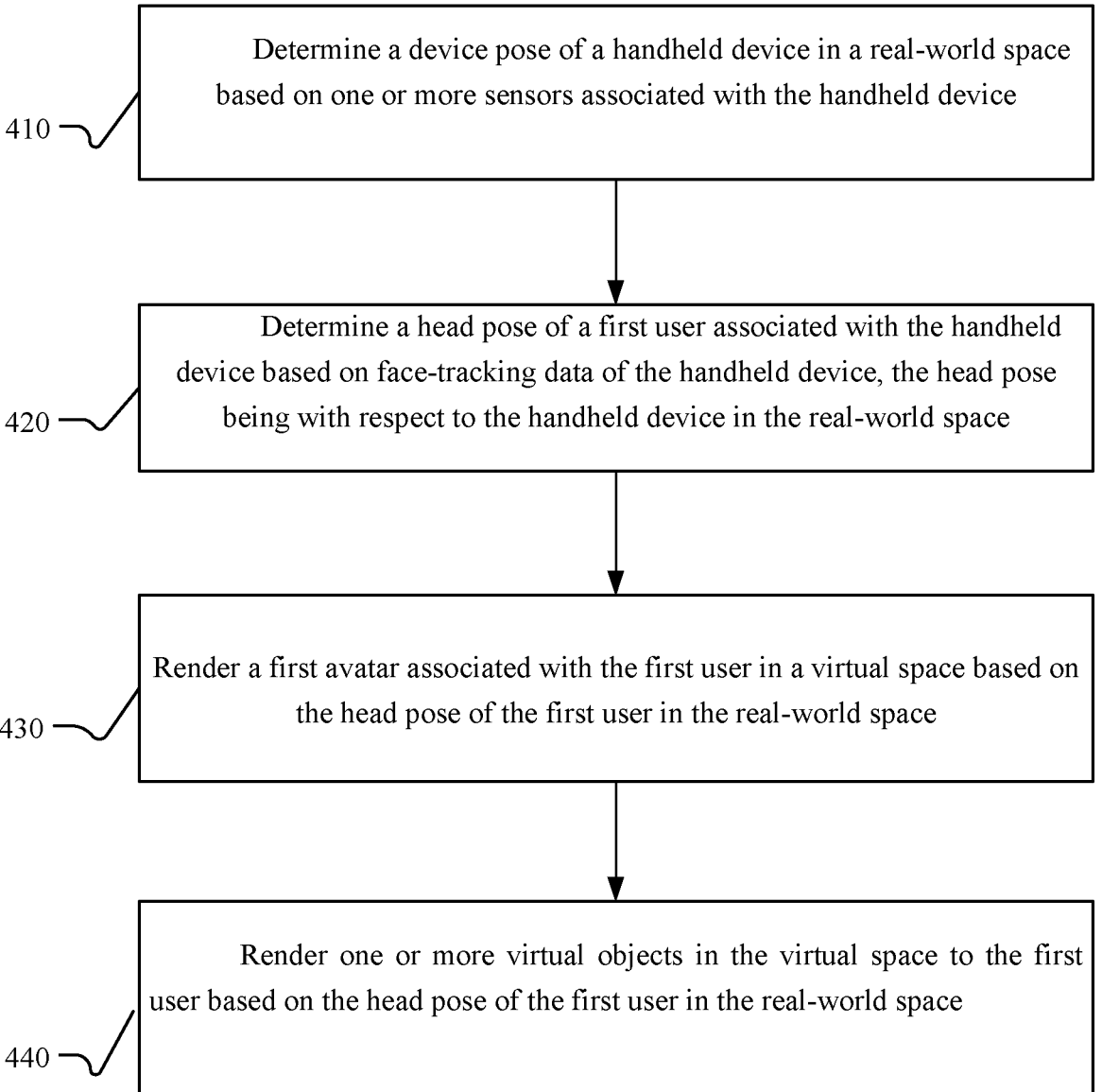

410 — Determine a device pose of a handheld device in a real-world space based on one or more sensors associated with the handheld device 420 — Determine a head pose of a first user associated with the handheld device based on face-tracking data of the handheld device, the head pose being with respect to the handheld device in the real-world space 430 — Render a first avatar associated with the first user in a virtual space based on the head pose of the first user in the real-world space 440 — Render one or more virtual objects in the virtual space to the first user based on the head pose of the first user in the real-world space

*FIG. 4*

ACCESSING ARTIFICIAL REALITY CONTENT THROUGH A HANDHELD DEVICE

TECHNICAL FIELD

This disclosure generally relates to artificial reality technology, in particular to accessing artificial reality content from a handheld device.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods of accessing artificial reality content through a handheld device (e.g., a smart phone or an artificial reality terminal). Traditionally, artificial reality content can be accessed through AR/VR headsets including the head-mounted-display. However, some users who do not have access to AR/VR headsets may still need to access the artificial reality content. To solve this problem, this disclosure describes a system and method which allow users to use handheld devices (e.g., smartphones, tablets, or artificial reality terminals) to access the artificial reality content and to socially interact with other AR/VR users in the metaverse, without using headsets. Normally, an AR/VR headset may use SLAM technology (and/or outside-in tracking technology) to determine its own 3D pose, which would then be used to place an avatar of the user in the metaverse and render content for the user based on the viewpoint of his head pose. However, when a user uses a handheld device to join the metaverse, the system would not know where the user's head is because the handheld device is not mounted on the user's head but is held in the user's hand(s). As such, the handheld device cannot directly know the user's head pose (including the head position and orientation in the three-dimensional space). Since there is no information about the head pose of the user, the metaverse won't be able to accurately place an avatar for the user in the metaverse or to appropriately render content for the user's actual viewpoint.

To solve this problem, in particular embodiments of this disclosure, the system may first determine the pose of the handheld device itself (including the device position and orientation in the three-dimensional space) using self-tracking based on SLAM (simultaneous localization and mapping) technology and/or outside-in tracking technology. Then, the system may use face tracking to determine the user's head pose, using the handheld device's position as a reference. By combining the handheld device's own pose and the relative head pose of the user, the system may determine the 3D head pose of the user using the handheld device. This information may be used to place the user's avatar in the metaverse with the correct pose, and/or to render artificial reality content for the user based on the user's viewpoint. To render the artificial reality content in the metaverse, in particular embodiments, the system may render the content with no alignment between the real world where the user is actually located (e.g., a real-world room) and the virtual world in the metaverse (e.g., a virtual room for playing board games). When the user joins the metaverse, his avatar may be placed in an arbitrary location in the virtual world. The user's movements in the real world would then drive the avatar's movements from that initial location in the virtual world.

In particular embodiments, to render the artificial reality content in the metaverse, the system may have the user's physical floor and the virtual floor aligned (even if the rest objects of the real world and the virtual worlds are not aligned). In such situations when there is some alignment between at least a portion (e.g., a floor surface, a table surface) of the real world and the virtual world, the system may use one or more real world objects (e.g., a physical board game) used by one user as an anchor to position other users' avatars and to render other virtual objects. In other words, the avatars and virtual objects rendered in the virtual world may be positioned with respect to the position of the anchoring object. For example, a physical board game used by one user may be mapped to the virtual board game rendered to another user playing in the same session of the board game in the same virtual room. For the users located at the same physical locations (e.g., in the same physical room), the avatar of a user may be rendered to other users as an overlaid on the real person images (as captured by cameras) or rendered slightly in front of the real person's position. The avatar of a user may have the same body pose with the real person of that user and may follow the motion of that user in real-time. In particular embodiments, the system may render one or more virtual objects for a user to enrich or enhance the user's appearance in the metaverse. For example, the user may receive, in the virtual game, a game item like a weapon, a crown, a neckless, a mask, a pair of glasses, a cape, etc. The system may render such item(s) in the metaverse and superimpose the rendered item(s) to the user's real person image. Such enriching virtual objects may be attached to the user's avatar or may be separate virtual objects that are not attached to the avatar of the user. In particular embodiments, the system may render a comic-like avatar for a user. The comic-like avatar may be rendered like a particular character based on the game context and/or based on the user's selection. The comic-like avatar may be rendered as an overlay on top of the real person image of the user.

When a handheld device user (e.g., a phone user) joins the metaverse without using headsets, the system may first use SLAM technology (and/or outside-in tracking technology) to determine the accurate pose of the handheld device itself (e.g., height from ground, front and back camera facing directions, bode pose, etc.). Then, the system may use the face and/or body tracking function of the handheld device to track the user's face and/or body in real-time to determine the user's head pose. In particular embodiments, to track the user's face, head, and body pose, the system may use one or more tacking technologies including, for example, but not limited to, an outside-in tracking technology, a smart watch, a wristband for arm or leg, a pair of smart glasses, etc. After that, the system may render an avatar for that user using the handheld device to join the metaverse. If that user is located within the same physical location with other users joining the game, the system may position the avatar of the handheld device user based on his actual relative position in the real world with respect to the anchor object (e.g., a game board) and/or other users in the same location. The avatar may be positioned slightly in front of the real person of that user and have a body pose that track that user's body pose and movement in real-time. For example, if the handheld device users move around in the real world or waves his hands, the system may use the handheld device to track such movement and cause his avatar to do the same. However, the avatar of the handheld device user may not mirror the user's body pose totally and may have some difference to improve the user experience. For example, the handheld device user may always extend his one hand forward in holding the handheld device during the process. Even the handheld device is aware of that arm posture, the system may render the avatar's hands and arms in a more natural manner (e.g., with both arms down or moving naturally like other users using headsets). In other words, the avatar may not have one hand extended forward like the real person in the real world. However, when that user engages other body motions (e.g., picking up a virtual game piece) other than holding the handheld device itself, the avatar may minor what the user does in the real world.

The handheld device may have one or more cameras (e.g., a front camera and a back cameras) or sensors (e.g., depth sensors) to track the user's hands, arms, and other body movements. For example, the system may use the front and back cameras of a phone held by the user to track the hand movement of the user when the user moves his hands to interact with other users or interact with the virtual game pieces. For example, when the user extends his other hand to the back space of the phone, the system may use the back cameras and/or other sensor to track and determine the accurate position of the user's hand. Then, the system may cause the user's virtual hand corresponding that the user's real hand to move in the virtual world, following the user's movement in the real world, to interact with other users or virtual game pieces (e.g., moving the board game piece from one place to another place). During this process, to other users in the virtual world, the phone user's avatar may appear and move just like other users using headsets. At times, the system might not be able to track the user's head (e.g., the phone falls off the user's hand, the user changes his holding hand, or the phone is not facing the user). When that happens, the metaverse system may freeze the user's avatar temporarily, if the time period for the last tracking is shorter than a threshold. Alternatively, since the system knows the pose of the phone, the system may move the avatar based on the phone's movements and assume the relative pose of the user's head remains the same. This assumption would hold as long as the phone's movement isn't too large during that period of time. Additionally, the virtual space, sometimes a user may have difficulty in recognizing the position and distance of other users' avatars without appropriate references. This may be particularly true for the phone users because they don't have stereo view as the headset users and lack depth cues. To solve this problem, the system may render a shadow for the avatar in the virtual world. The shadow may be projected from a particular direction (e.g., top-down) to a virtual (e.g., a virtual floor) or real surface (e.g., a real floor). The position, size, and shape of the shadow may provide an effective visual cue for the position, distance, and size of the avatar, providing a depth cue for the phone user. The system may also render a shadow for each virtual object that the handheld device user may see or interact with in the metaverse. The position, shape, and size of the shadow may depend on the position, shape, size, distance, and relative position of the virtual object with respect to other virtual or real objects in the environment. Such virtual object may be a virtual game piece, a virtual item in the metaverse environment, etc. The shadow of the virtual object may provide an effective visual cue of the position, distance, size, and shape of the virtual object for the handheld device user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example method of rendering an avatar in the metaverse for a user joining the metaverse through a handheld device.

DESCRIPTION OF EXAMPLE EMBODIMENTS

Figure 1A:
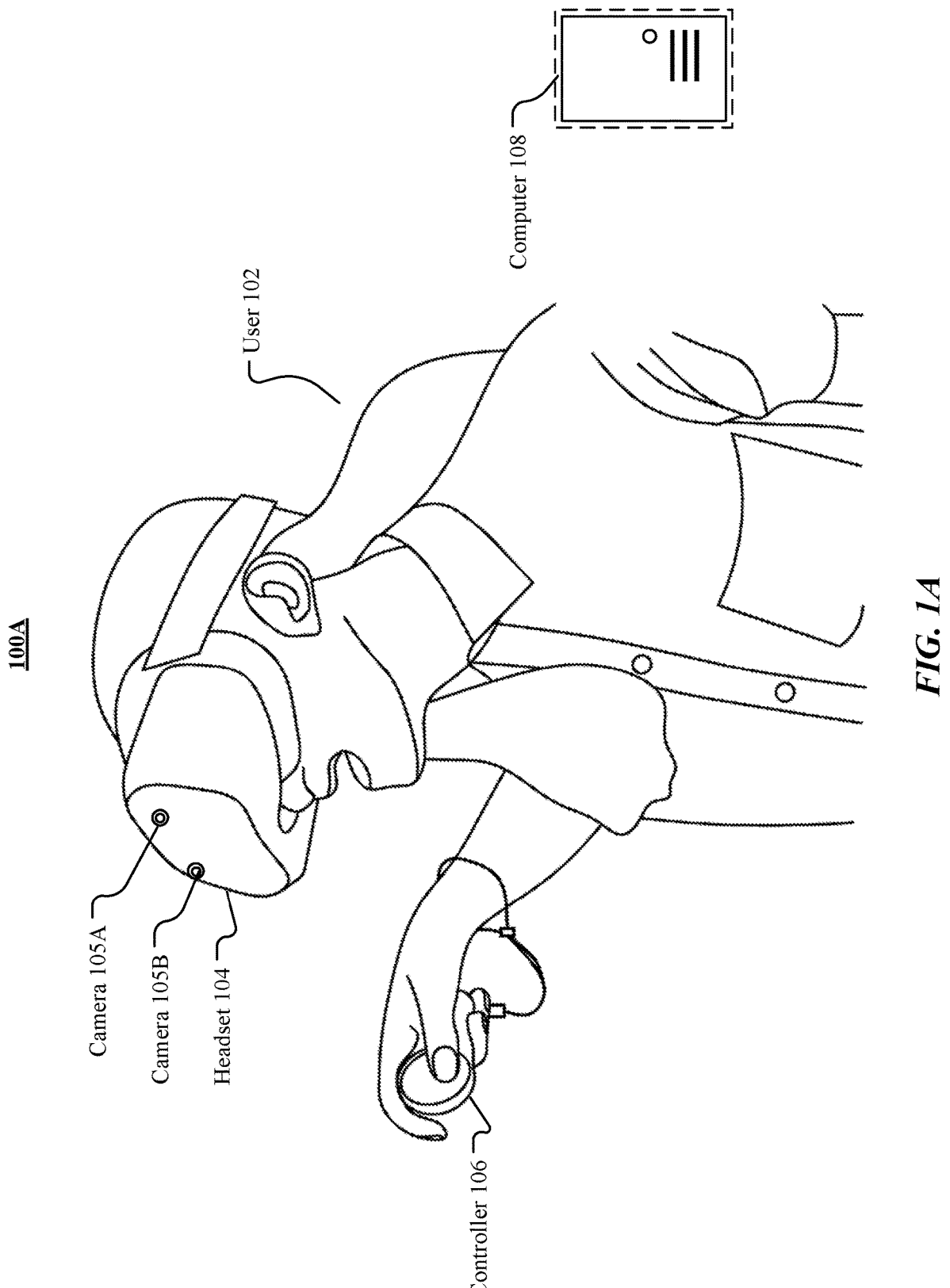
FIG. 1A illustrates an example artificial reality system.

FIG. 1A illustrates an example artificial reality system 100A with a controller 106. In particular embodiments, the artificial reality system 100A may be a virtual reality system, an augmented reality system, or a mixed reality system. The artificial reality system 100A may include a head-mounted headset 104, a controller 106, and a computing system 108. A user 102 may wear the head-mounted headset 104, which may display visual artificial reality content to the user 102. The headset 104 may include an audio device that may provide audio artificial reality content to the user 102. In particular embodiments, the headset 104 may include one or more cameras which can capture images and videos of environments. For example, the headset 104 may include front-facing cameras 105A and 105B to capture images in the environment of the user 102 and may include one or more cameras facing other direction (not shown) to capture the images of the user's body or the environment from other perspective. The headset 104 may include an eye tracking system to determine the vergence distance of the user 102. The headset 104 may be referred as a head-mounted display (HMD). The controller 106 may include a trackpad and one or more buttons. The controller 106 may receive inputs from the user 102 and relay the inputs to the computing system 108. The controller 106 may also provide haptic feedback to the user 102. The computing system 108 may be connected to the headset 104 and the controller 106 through cables or wireless communication connections. The computing system 108 may control the headset 104 and the controller 106 to provide the artificial reality content to the user 102 and may receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
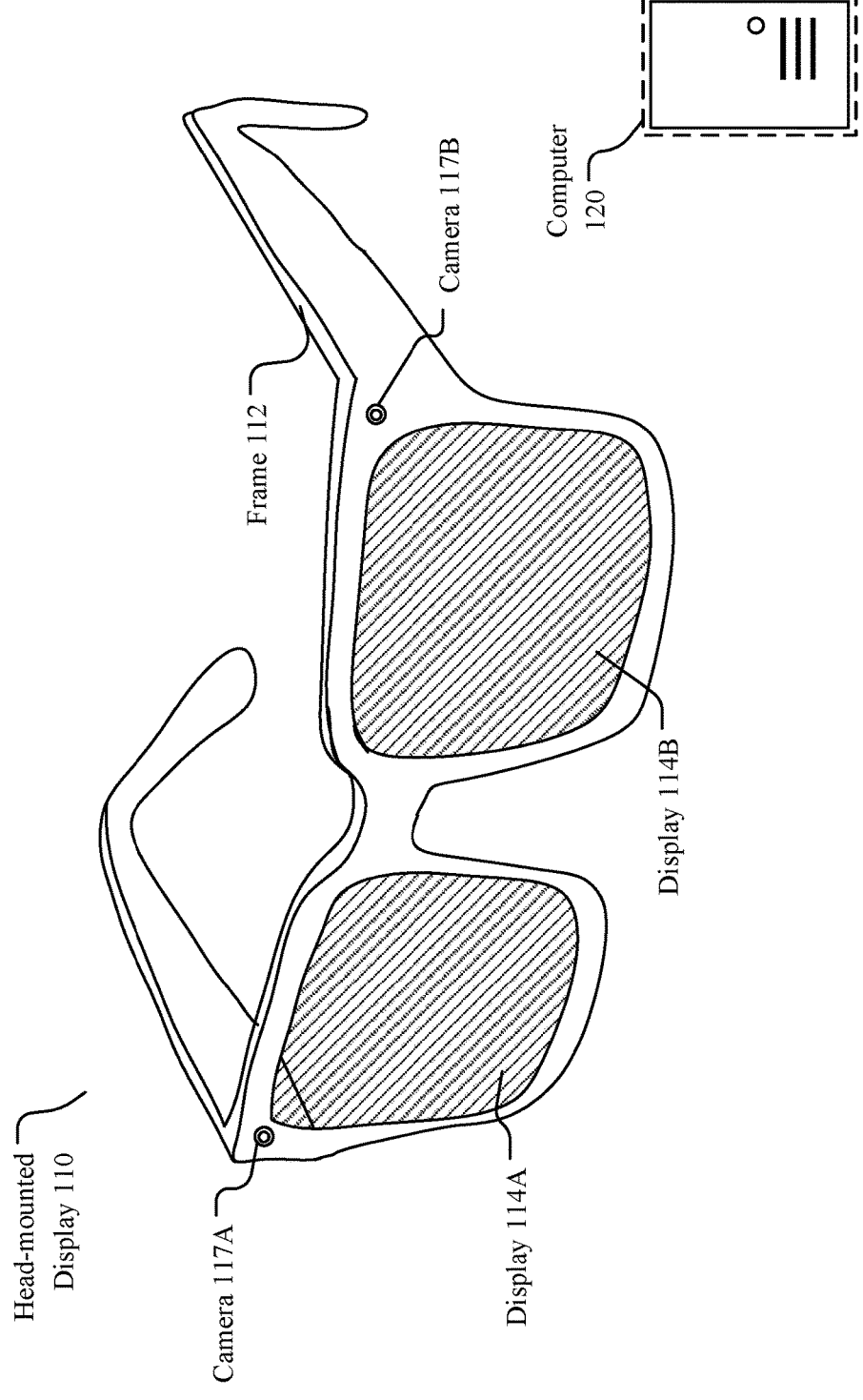
FIG. 1B illustrates an example augmented reality system.

FIG. 1B illustrates an example augmented reality system 100B. The augmented reality system 100B may include a head-mounted display (HMD) 110 (e.g., AR glasses) comprising a frame 112, one or more displays 114A and 114B, and a computing system 120, etc. The displays may be transparent or translucent allowing a user wearing the HMD 110 to look through the displays 114A and 114B to see the real world, and at the same time, may display visual artificial reality content to the user. The HMD 110 may include an audio device that may provide audio artificial reality content to users. In particular embodiments, the HMD 110 may include one or more cameras (e.g., 117A and 117B), which can capture images and videos of the surrounding environments. The HMD 110 may include an eye tracking system to track the vergence movement of the user wearing the HMD 110. The augmented reality system 100B may further include a controller (not shown) having a trackpad and one or more buttons. The controller may receive inputs from the user and relay the inputs to the computing system 120. The controller may provide haptic feedback to the user. The computing system 120 may be connected to the HMD 110 and the controller through cables or wireless connections. The computing system 120 may control the HMD 110 and the controller to provide the augmented reality content to the user and receive inputs from the user. The computing system 120 may be a standalone host computer system, an on-board computer system integrated with the HMD 110, a mobile device, or any other hardware platform capable of providing artificial reality content to and receiving inputs from users.

Traditionally, artificial reality content can be accessed through AR/VR headsets including the head-mounted-display. However, some users who do not have access to AR/VR headsets may still need to access the artificial reality content. To solve this problem, this disclosure describes a system and method which allow users to use handheld devices (e.g., smartphones, tablets, or artificial reality terminals) to access the artificial reality content and to socially interact with other AR/VR users in the metaverse, without using headsets. Normally, an AR/VR headset may use SLAM to determine its own 3D pose, which would then be used to place an avatar of the user in the metaverse and render content for the user based on the viewpoint of his head pose. However, when a user uses a handheld device to join the metaverse, the system would not know where the user's head is because the handheld device is not mounted on the user's head but is held in the user's hand(s). As such, the handheld device cannot directly know the user's head pose (including the head position and orientation in the three-dimensional space). Since there is no information about the head pose of the user, the metaverse won't be able to accurately place an avatar for the user in the metaverse or to appropriately render content for the user's actual viewpoint.

To solve this problem, in particular embodiments of this disclosure, the system may first determine the pose the handheld device itself (including the device position and orientation in the three-dimensional space) using self-tracking based on SLAM (simultaneous localization and mapping) technology and/or outside-in tracking technology. Then, the system may use face tracking to determine the user's head pose, using the handheld device's position as a reference. By combining the handheld device's own pose and the relative head pose of the user, the system may determine the 3D head pose of the user using the handheld device. This information may be used to place the user's avatar by the metaverse with the correct pose, and/or to render artificial reality content for the user based on the user's viewpoint. To render the artificial reality content in the metaverse, in particular embodiments, the system may render the content with no alignment between the real world where the user is actually located (e.g., a real-world room) and the virtual world in the metaverse (e.g., a virtual room for playing board games). When the user joins the metaverse, his avatar may be placed in an arbitrary location in the virtual world. The user's movements in the real world would then drive the avatar's movements from that initial location in the virtual world.

In particular embodiments, to render the artificial reality content in the metaverse, the system may have the user's physical floor and the virtual floor aligned (even if the rest objects of the real world and the virtual worlds are not aligned). In such situations when there is some alignment between at least a portion (e.g., a floor surface, a table surface) of the real world and the virtual world, the system may use one or more real world objects (e.g., a physical board game) used by one user as an anchor to position other users' avatars and to render other virtual objects. In other words, the avatars and virtual objects rendered in the virtual world may be positioned with respect to the position of the anchoring object. For example, a physical board game used by one user may be mapped to the virtual board game rendered to another user playing in the same session of the board game in the same virtual room. For the users located at the same physical locations (e.g., in the same physical room), the avatar of a user may be rendered to other users as an overlaid on the real person images (as captured by cameras) or rendered slightly in front of the real person's position. The avatar of a user may have the same body pose with the real person of that user and may follow the motion of that user in real-time. In particular embodiments, the system may render one or more virtual objects for a user to enrich or enhance the user's appearance in the metaverse. For example, the user may receive, in the virtual game, a game item like a weapon, a crown, a mask, a pair of glasses, a cape, etc. The system may render such item(s) in the metaverse and superimpose the rendered item(s) to the user's real person image. Such enriching virtual objects may be attached to the user's avatar or may be separate virtual objects that are not attached to the avatar of the user. In particular embodiments, the system may render a comic-like avatar for a user. The comic-like avatar may be rendered like a particular character based on the game context and/or based on the user's selection. The comic-like avatar may be rendered as an overlay on top of the real person image of the user.

In particular embodiment, when a handheld device user (e.g., a phone user) joins the metaverse without using headsets, the system may first use SLAM technology (and/or outside-in tracking technology) to determine the accurate pose of the handheld device itself (e.g., height from ground, front and back camera facing directions, bode pose, etc.). Then, the system may use the face and/or body tracking function of the handheld device to track the user's face and/or body in real-time to determine the user's head pose. After that, the system may render an avatar for that user using the handheld device to join the metaverse. If that user is located within the same physical location with other users joining the game, the system may position the avatar of the handheld device user based on his actual relative position in the real world with respect to the anchor object (e.g., a game board) and/or other users in the same location. The avatar may be positioned slightly in front of the real person of that user and have a body pose that track that user's body pose and movement in real-time. For example, if the handheld device users move around in the real world or waves his hands, the system may use the handheld device to track such movement and cause his avatar to do the same. However, the avatar of the handheld device user may not mirror the user's body pose totally and may have some difference to improve the user experience. For example, the handheld device user may always extend his one hand forward in holding the handheld device during the process. Even the handheld device is aware of that arm posture, the system may render the avatar's hands and arms in a more natural manner (e.g., with both arms down or moving naturally like other users using headsets). In other words, the avatar may not have one hand extended forward like the real person in the real world. However, when that user engages other body motions (e.g., picking up a virtual game piece) other than holding the handheld device itself, the avatar may minor what the user does in the real world.

In particular embodiments, the handheld device may have one or more cameras (e.g., a front camera and a back cameras) or sensors (e.g., depth sensors) to track the user's hands, arms, and other body movements. For example, the system may use the front and back cameras of a phone held by the user to track the hand movement of the user when the user moves his hands to interact with other users or interact with the virtual game pieces. For example, when the user extends his other hand to the back space of the phone, the system may use the back cameras and/or other sensor to track and determine the accurate position of the user's hand. Then, the system may cause the user's virtual hand corresponding that the user's real hand to move in the virtual world, following the user's movement in the real world, to interact with other users or virtual game pieces (e.g., moving the board game piece from one place to another place). During this process, to other users in the virtual world, the phone user's avatar may appear and move just like other users using headsets. At times, the system might not be able to track the user's head (e.g., the phone falls off the user's hand, the user changes his holding hand, or the phone is not facing the user). When that happens, the metaverse system may freeze the user's avatar temporarily, if the time period for the last tracking is shorter than a threshold. Alternatively, since the system knows the pose of the phone, the system may move the avatar based on the phone's movements and assume the relative pose of the user's head remains the same. This assumption would hold as long as the phone's movement isn't too large during that period of time. Additionally, the virtual space, sometimes a user may have difficulty in recognizing the position and distance of other users' avatars without appropriate references. This may be particularly true for the phone users because they don't have stereo view as the headset users and lack depth cues. To solve this problem, the system may render a shadow for the avatar in the virtual world. The shadow may be projected from a particular direction (e.g., top-down) to a virtual (e.g., a virtual floor) or real surface (e.g., a real floor). The size and shape of the shadow may provide an effective visual cue for the position, distance, and size of the avatar, providing a depth cue for the phone user. In particular embodiments, the system may also render a shadow for each virtual object that the handheld device user may see or interact with in the metaverse. The position, shape, and size of the shadow may depend on the position, shape, size, distance, and relative position of the virtual object with respect to other virtual or real objects in the environment. Such virtual object may be a virtual game piece, a virtual item in the metaverse environment, etc. The shadow of the virtual object may provide an effective visual cue of the position, distance, size, and shape of the virtual object for the handheld device user.

Particular embodiments of this disclosure may allow users who have no access to artificial reality headsets to interact with virtual objects (e.g., playing games) or interact with other users in the metaverse. Particular embodiments of this disclosure may provides a low cost solution for metaverse users to access the virtual content and interact with other users located at the same or a remote location in the real world. Particular embodiment of this disclosure may provide a better user experience for the user using a handheld device (e.g., a smartphone to access the metaverse) by allowing the avatar of the handheld device user to partially deviate from the user's arm pose and to follow the user's body pose in other aspects.

Figure 2A:
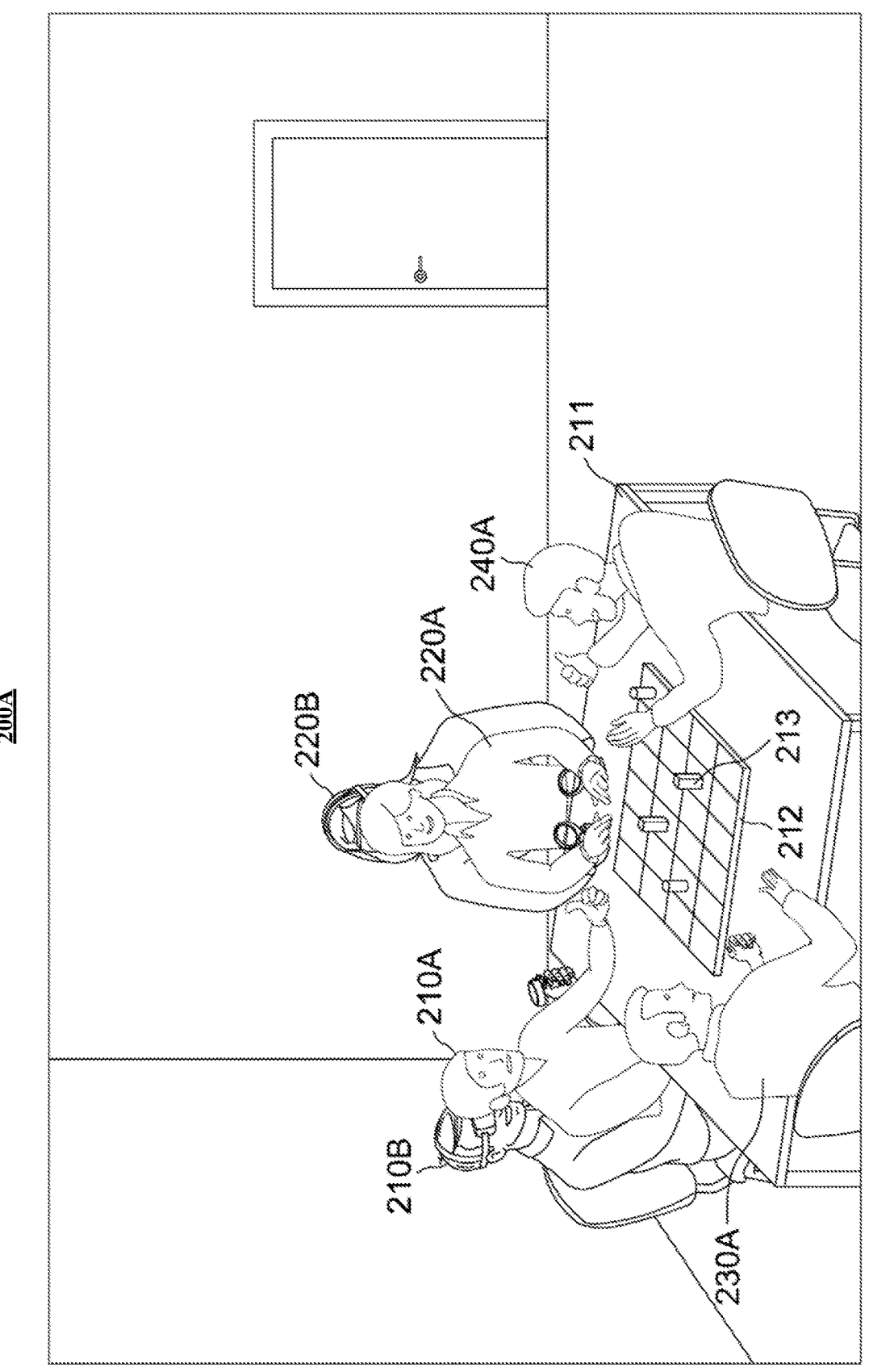
FIG. 2A illustrates an example artificial reality scene with multiple users playing a board game in the metaverse.
Figure 2B:
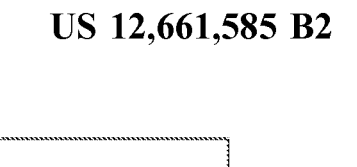
FIG. 2B illustrates an example real-world scene showing a meeting room shared by a first user and a second user playing the board game through the metaverse using a real-world game board.
Figure 2C:
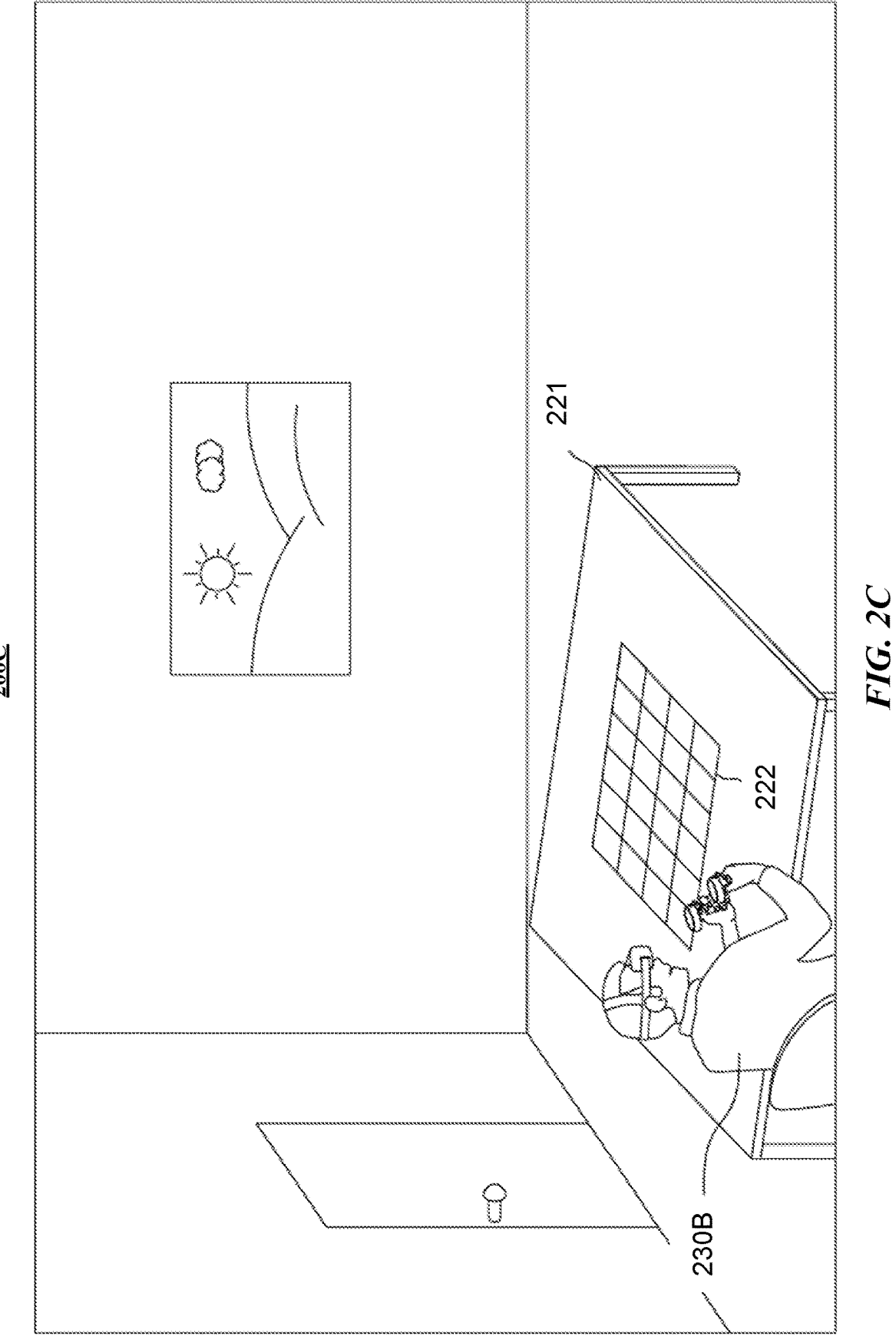
FIG. 2C illustrates an example real-world scene with a third user joining the board game from a remote physical location using a physical game board.
Figure 2D:
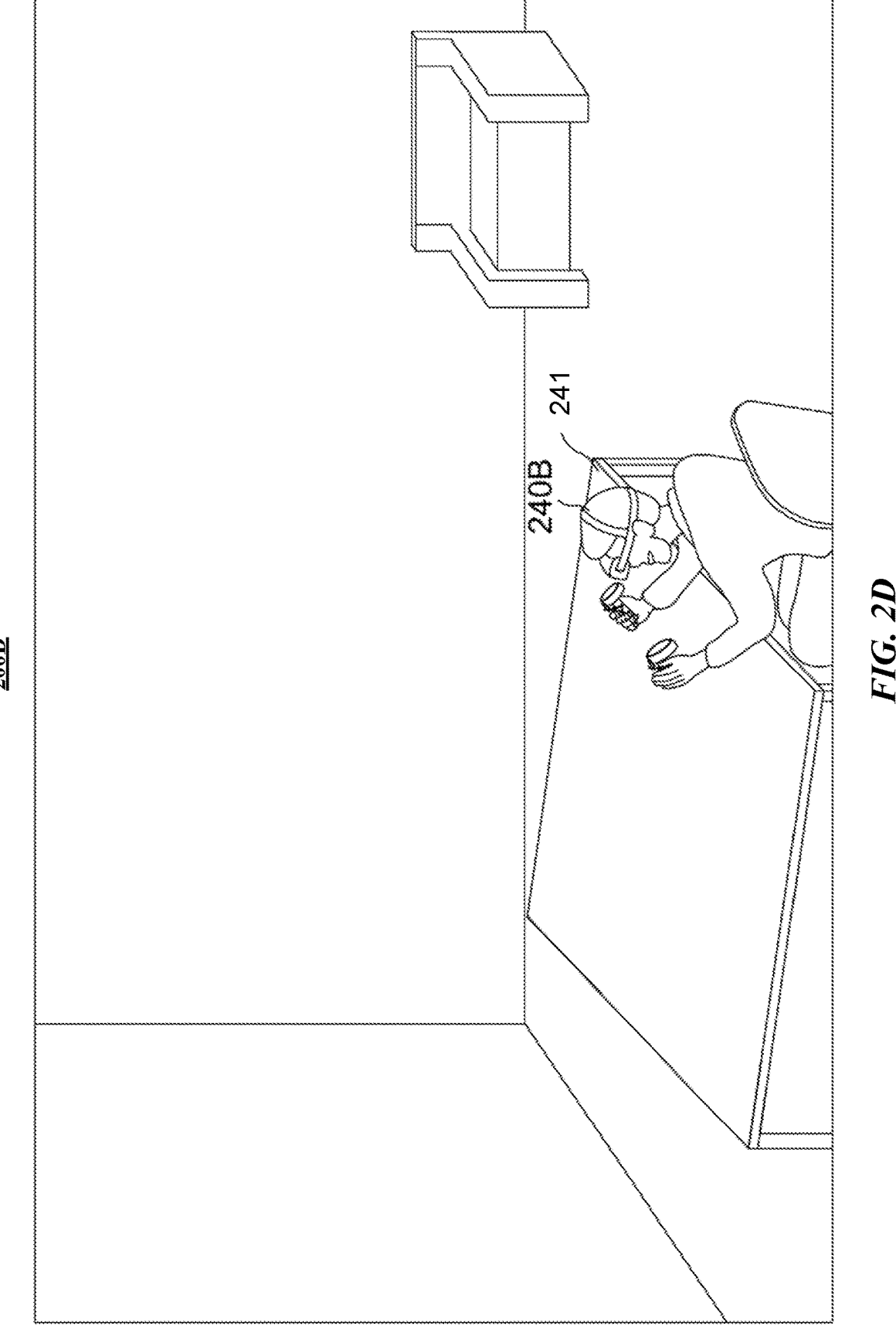
FIG. 2D illustrates an example real-world scene showing a fourth user joining the board game from another remote physical location without using a physical game board.

FIG. 2A illustrates an example artificial reality scene 200A with multiple users playing a board game in the metaverse. FIG. 2B illustrates an example real-world scene 200B showing a meeting room shared by a first user 210B and a second user 220B playing the board game through the metaverse using a real-world game board 212. FIG. 2C illustrates an example real-world scene 200C with a third user 230B joining the board game from a remote physical location using a physical game board 222. FIG. 2D illustrates an example real-world scene 200D showing a fourth user joining the board game from another remote physical location without using a physical game board. In particular embodiments, the system may allow users from the same physical location or from different physical locations in the real world to join the same virtual section (e.g., a virtual board game) in the metaverse. As an example and not by way of limitation, the users 210B, 220B, 230B, and 240B (shown in FIGS. 2B-2D) may join the same virtual board game in the metaverse and interact with each other and the virtual game pieces through the metaverse. In this example, the first user 210B and the second user 220B (shown both in FIG. 2A and FIG. 2B) may be located at a same first physical location such as a meeting room as shown in FIG. 2B. A third user 230B may be located at a second physical location that is different from the first physical location where the first and second users 210B and 220B are located. A fourth user 240B may be located at a third physical location that is different from both the first physical location and the second physical location. All these four users 210B, 220B, 230B, and 240B may wear artificial reality headsets with head-mounted displays. Some users (e.g., 210B, 220B, 230B) may use a real-world game board in front of them and the virtual game pieces 213 may be rendered on the surface of the real-world game board (e.g., 212, 222) as augmented reality virtual objects. In FIG. 2D, the fourth user 240B may be in front of a table which does not have a real-world game board and the system may render a virtual game board for the fourth user 240B.

Furthermore, the system may render an avatar for each user in the metaverse and render the virtual game pieces for the board game. The system may allow the users (210B, 220B, 230B, and 240B) to interact with the artificial reality contents (e.g., the virtual game pieces 213) through hand gestures or other body movements as tracked by sensors, cameras, and/or controllers. Each user may also interact with other users using body postures, body movements (e.g., waving hands, walking around, high fives) or language through the metaverse. It is notable that, in FIGS. 2A-2D, although the users use the controllers associated with the headset to interact with virtual objects and/or other users, the system, methods, and process discussed in this disclosure are not limited thereto. For example, the users may merely use their hands (without holding the controllers) or other body parties (e.g., nodding a head) to interact with the virtual objects and/or other users. Such hand or body movement may be tracked by the cameras and/or sensors of the headset.

In particular embodiments, the system may align the virtual space of the metaverse to the real-world space where one or more users are located. The system may align a virtual surface in the virtual space to a real-world surface. For example, for virtual reality scenes in the metaverse, the system may render one or more avatars and/or virtual objects (e.g., a table, a chair) on a virtual floor and align that virtual floor to a real floor on which one or more users are located in the real world. For the headset users, the headset worn by each user may have one or more sensors and/or cameras that can be used to determine the user's body pose and motion in the real world in real-time or semi-real time. The system may determine the user's body pose (e.g., a head pose, a hand pose, etc.) and motions (e.g., waving hands, walking around) and may cause the user's avatar in the metaverse to follow or mirror the user in real-time. The avatar of a user in the metaverse may have the same body pose and body motion with the user in the real world. For example, when the user is sitting in the real world, the user's avatar may also sit in the virtual world. When the user is standing or walking on the floor in the real world, the user avatar may mirror that standing or walking in the virtual floor that is mapped to the real-world floor. In a virtual reality scene, when a new user joins the virtual section, the user's avatar may be first positioned in an arbitrary position in the virtual scene. However, the user avatar on the virtual floor may follow the user's motion in the real world based on the user's relative motion on the real-world floor which is mapped to the virtual floor in the virtual space.

In particular embodiments, the virtual world and the real world may not need to be aligned. For example, the virtual world may have a large virtual space where the avatar can move around but the user may be located in a small room and the user needs not to move around in the real world to move the avatar in the virtual space. For example, the user may simply tap or double click on the virtual floor (or any related virtual surface or position) to cause his avatar to move to that location without even moving in the real world. This gives the freedom where the real-world environment is small to the user to move around. This allows the avatar to walk around in the virtual world while the user can sit in the chair without moving in the real world. In particular embodiments, the system may allow the headset user to use one or more hand gestures and/or body gestures to move the avatar in the virtual world while the headset user stays at the same position in the real-world environment. The hand gestures and/or body gestures of the headset user that are used to control the motion of the avatar may be tracked by the headset sensors, cameras, and/or one or more controllers. The headset user may also use the tap or double click on the virtual floor or a related virtual surface or position to move his/her avatar in the virtual world without moving around in the real world.

In particular embodiments, the metaverse scenes may be rendered as augmented reality scenes or mixed reality scenes. As another example, for the first user 210B and the second user 220B who are at the same physical location, the system may render for each user an augmented reality scene based on that user's head pose and perspective. The system may render the virtual objects (e.g., the game pieces 213 for the board game) directly on the surface of the real-world game board 212 used by the two users 210B and 220B. Similarly, for the third user 230B, the system may directly render the virtual game pieces 213 on the real-world game board 222 on the table 221 in front of the third user 230. However, for the fourth user 240B, who does not have a real-world game board in front of him, the system may render a virtual game board and together with the virtual game pieces on the virtual game board on the surface of the real-world table 241 in front of the fourth user 240B.

In particular embodiments, the system may render an avatar for each user. For augmented reality scene, the avatar of a user may be overlaid on the real person in the real-world scene. For example, the avatar 210A of the first user 210B may be overlaid on the real person of the first user 210B in the augmented reality scene as shown in FIG. 2A. Similarly, the avatar 220A may be rendered to be overlaid on the real person of the second user 220B. An avatar that is overlaid to a user may have the same body pose with that user. The system may track the body pose and motion of each user (e.g., using the headsets worn by respective users) and cause the corresponding avatar of each user to follow that user in real-time. An augmented reality scene rendered to a user may include one or more avatars of other users that are overlaid to the respective users that are located at the same physical location with that user in the real world. A user wearing a headset and seeing the augmented reality scene may see both the real person of other users at the same physical location and their respective avatars overlaid to these users. The avatar of a user may be positioned slightly in front of the real person position or may be positioned at the same position to the real person in the real world. The augmented reality scene may also include one or more virtual objects that are aligned with the real-world objects. For example, for the first user 210B and the second user 220B, the virtual game piece 213 may be positioned on the surface of the real-world game board 212. For the third user 230B, the virtual game piece 213 may positioned on the real-world game board 222. It is notable that the avatar may be overlaid to the real person in the real world only in the augmented reality scenes that are rendered for the users at the same physical location in the real world. For users that are located at different physical locations, the system may only render an avatar for each user and position the avatar based on the relative position of that user to an anchor object in the scene. In particular embodiments, the system may render one or more virtual objects for a user to enrich or enhance the user's appearance in the metaverse. For example, the user may receive, in the virtual game, a game item like a weapon, a crown, a neckless, a mask, a pair of glasses, a cape, etc. The system may render such item(s) in the metaverse and superimpose the rendered item(s) to the user's real person image. Such enriching virtual objects may be attached to the user's avatar or may be separate virtual objects that are not attached to the avatar of the user. In particular embodiments, the system may render a comic-like avatar for a user. The comic-like avatar may be rendered like a particular character based on the game context and/or based on the user's selection. The comic-like avatar may be rendered as an overlay on top of the real person image of the user.

In particular embodiments, rendering a virtual avatar on top of a real person in augmented reality (if passthrough is activated and if the other person is located in the same physical space) may not be the default configuration. The system may only have items or parts of a full avatar to be superimposed when using augmented reality. For example, when a player picks up a game item (like a crown, hat, cape, etc.), that item may be rendered on top of the real person. However, an example for a full-body avatar may be a kid's game about one or more comic characters. In such scenario, rendering a virtual comic avatar on top of a real person in augmented/mixed reality may be a default configuration. In particular embodiment, avatars may be rendered for real person in the same room to provide a more consistent user experience for the headset or handheld device users in the same room (because if the avatar is not rendered for the real persons, these users will see a different AR scene i.e., real person image than other remote users who see the avatar). Furthermore, the consistency between the avatar and the real person may also be used as an indication that the system is working well (e.g., no delay or frozen) in the virtual world. For example, if one user sees an inconsistency or frozen avatar of another user with respect to that real person, the user may detect a system lag or other problems and intervene timely.

In particular embodiments, for the real-world and virtual-world alignment purpose, the system may use one or more anchor objects to position other virtual objects and/or avatars in the metaverse. An anchor object may be a real-world object or a virtual object that is shared in the scene rendered to each user in the same game session. The anchor object may be used as a position reference between the real-world space and the virtual space so that the system can correctly position other virtual objects and avatars in the metaverse. As an example and not by way of limitation, the users 210B and 220B, which are located at the same physical location, may use a real-world game board 212 to play the virtual board game. The real-world game board 212 may be placed on the table 211 in the meeting room where the users 210B and 220B are located. The system may use the real-world game board 212 and/or the table surface of the table 211 as an anchor object to render other virtual objects and avatars in the metaverse. For example, the system may render the virtual game piece 213 on the surface of the real-world game board 212.

As another example, the system may map the real-world game board 212 used by the first user 210B and the second user 220B to the other real-world game board 222 used by the third user 230B. The system may position the avatars 210A and 220A for the first user 210B and the second user 220B relative to the real-world game board 212 (e.g., the first user 210B on one side, and the second user 220B on another side). The system may position the avatar 230A relative to the real-world game board 222 on one side of the game board. Because the real-world game boards 213 and 222 are mapped to each other, the system can position the avatar 230A of the second user 230B to a position that is not occupied by the first user 210B or the second user 220B in the virtual game. In other words, by using the real-world game boards 213 and 222 as the anchor object, the system may correct position the three avatars 210A, 220A, and 230A correctly in the virtual space. Because the fourth user 240B does not have a real-world keyboard, the system may render a virtual game board to the fourth user 240B. This virtual game board may be mapped to the real-world game boards 213 and 222 so that the system can position the fourth user 240B at a position that is not occupied by the other three users in the virtual space. In other words, the system may use the anchor object to align the avatars and virtual objects in the virtual space.

In particular embodiments, the virtual game board rendered to the fourth user 240B may be optionally placed on and aligned with the table 241 used by the fourth user. In that case, the surface of the table 241 in front of the fourth user 240B may be mapped to the surfaces of the table 222 used by the third user 230B and/or the table 211 used by the first and second users 210B and 220B. In other words, the system may use the table surface as an anchor object to place the avatars and other virtual objects. In particular embodiments, the system may render the virtual game board or the fourth user 240B in a way that is not aligned to a real-world object in the fourth user's environment (e.g., the virtual game board may be float in the air rather than placed on the surface of the table 241). In other words, if another user wearing an artificial reality headset but does not have table in his room, the user may still join the virtual game session and play the virtual board game with other users with the virtual game board rendered in the virtual space not aligned to the real-world object in his environment (except the headset worn by that user to which the virtual game board is aligned).

To use the anchor object, the system may first determine the position, shape, and size of the anchor object (e.g., the real-world game board 212). Then, the system may map that anchor object to all scenes rendered to all users of the same virtual section to align and correctly position the avatars and virtual objects. Such determination may be completed by one or more sensors or cameras associated with the artificial reality headsets worn by the users. In particular embodiments, to protect the user's privacy, the system may use an ad-hoc alignment between several headsets without exchanging feature maps of the surrounding. All location data may be handled locally on-device only. To do this, the system may use a pattern tracker where an openly available game board is used to register and align multiple devices across different locations. The pattern tracker may only use the information related to the open game board to align the artificial reality scenes of different users. No private information may be exchanged between devices used by different users for aligning the real and/or virtual objects for different users. This reduces friction to align multiple devices significantly when considering the system architecture and privacy. At the same time, the ability to use a real physical object like a board game can noticeably increase the immersiveness of game experiences.

In particular embodiments, the system may render a different perspective of the same scene or a different scene to each user based on that user's perspective and configuration, for the users in the same virtual game in the metaverse. For examples, for the first and second users 210B and 220B located in the same room, these two users may see the avatar of each other rendered at the real person position in the augmented reality scene. Beside the virtual objects, the game environment may be their real-world environment in the augmented reality scene. When the third and fourth user 230B and 240B join the virtual board game, their avatar may be rendered to the first and second user 210B and 220B in their real-world environment (e.g., at one side of the table 211 or even on the surface of the table 211). However, for the third and fourth users 230B and 240B, the system may render the virtual game pieces and avatars of other users in either virtual reality scene or augmented reality scene based on their configuration and setting. For example, the third user 230B who has a real-world game board may choose to play the game in the augmented reality scene using his real-world game board. The avatars of the other three users may be rendered in the real-world environment where the third user 230 is located. As another example, the fourth users 240B, who does not have a real-world game board, may choose to play the virtual game in a virtual reality environment. As such, the avatars of the other three users may be rendered in a virtual environment that may be different from the real-world environment where the fourth user is located. It is notable that, in an augmented reality (AR) application, rendering a virtual avatar as an overlay to the real person image may be one option the system can be configured to operate. However, the methods, systems, and processes of this disclosure are not limited thereto. For example, the system may only display an avatar for a user without displaying his/her camera image even in the AR scene (while other real-world objects or users' camera may be displayed in the AR scene selectively based on the system configuration).

Figure 2E:
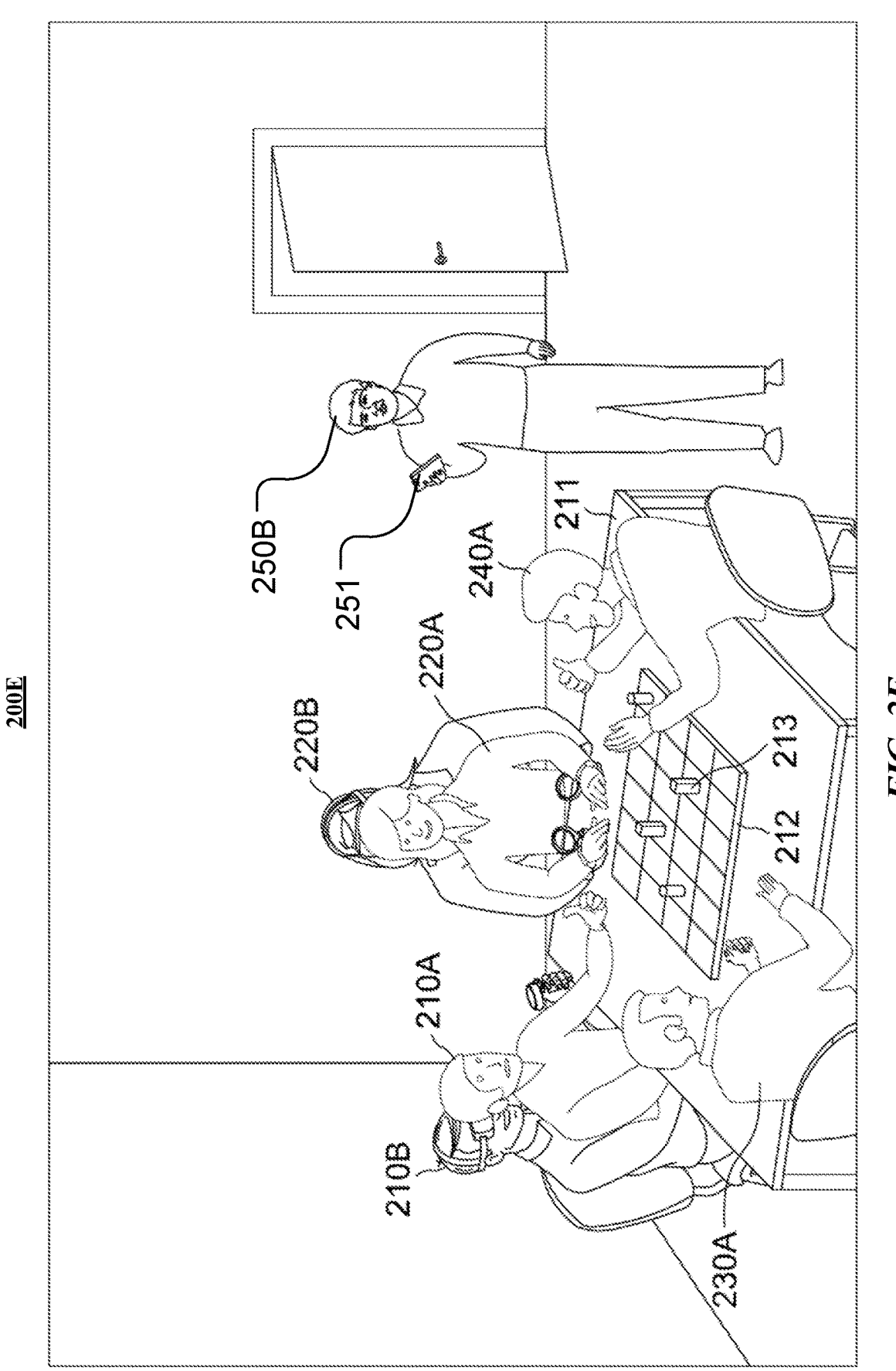
FIG. 2E illustrates an example real-world scene where the fifth user is holding the handheld device to join the virtual board game.
Figure 2F:
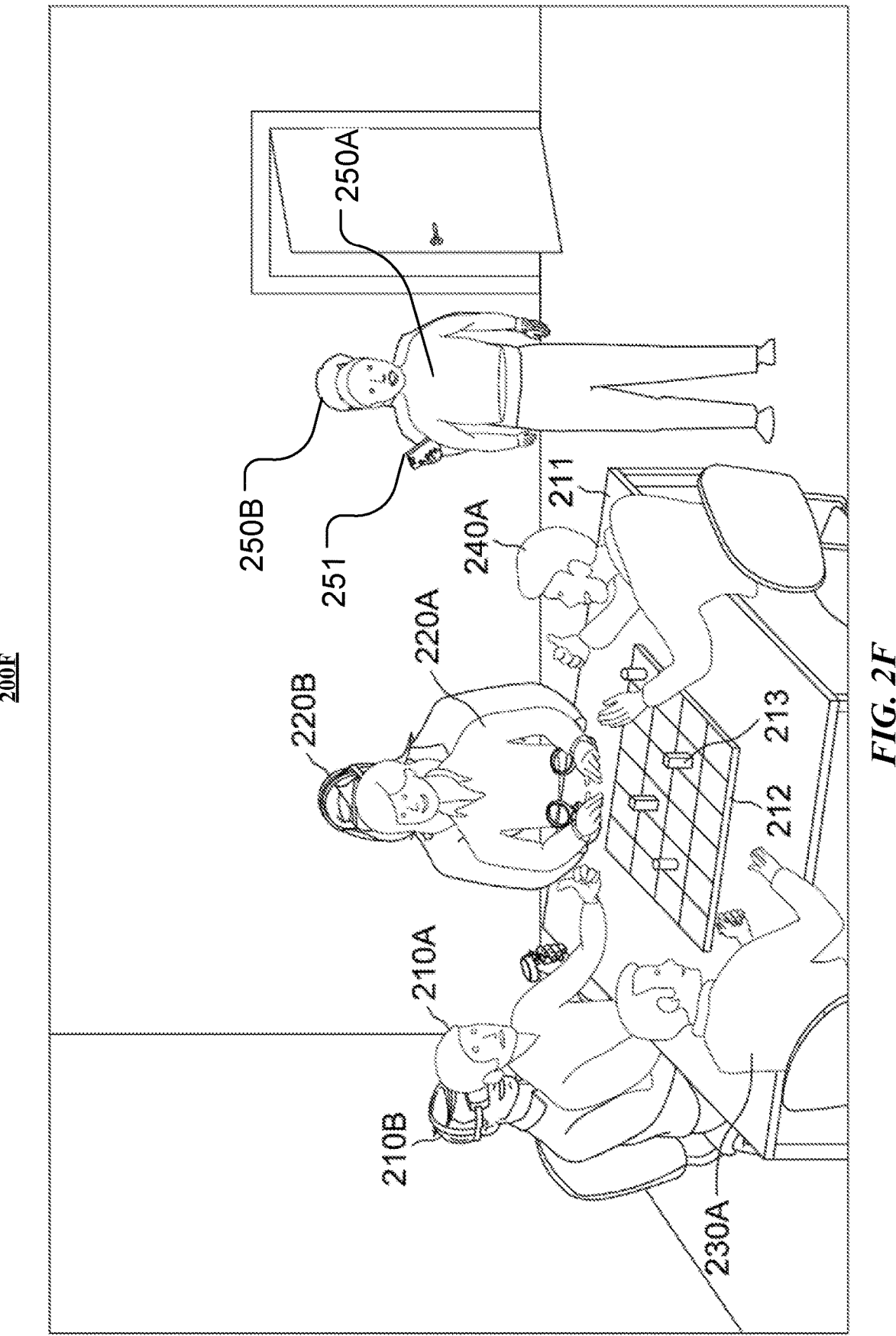
FIG. 2F illustrates an example scene including avatar for the fifth user who joins the same virtual board game using the handheld device.

FIG. 2E illustrates an example real-world scene 200E where the fifth user 250B is holding the handheld device 251 to join the virtual board game. FIG. 2F illustrates an example scene 200F including the avatar 250A for the fifth user 250B who joins the same virtual board game using the handheld device 251. In particular embodiments, the system may allow users to use a handheld device and without using headsets to join the same virtual section in the metaverse with other users using artificial reality headsets. It is notable that, in this disclosure, the term "handheld device" may refer to an electronic device that can be held by one or more hands of the user but is not limited to devices held by hands. For example, a handheld device may be mounted on a standing or supporting device (e.g., a tripod, a selfie stick, a smartphone holder, etc.).

As an example and not by way of limitation, the fifth user 250B may join the virtual board game section of the four users (210B, 220B, 230B, and 240B) using a handheld device 251. The handheld device 251 may be a smartphone, a tablet, a mobile computer, a metaverse terminal, etc. In this example, the fifth user 250B may be located at the same physical location with the first and second users 210B and 220B within the same meeting room. The fifth user 250B may hold the handheld device 251 in his right hand, with the display and one or more front-facing cameras facing the face of the fifth user 250B. The system may first determine a device pose including the position and the orientations of the handheld device in the three-dimensional space. For example, the device pose may include a height of the device from the real-world floor where the fifth user is standing, and the orientation angles of the device in the three-dimensional space. The system may use the device pose as the reference for determining the head pose and body pose of the fifth user 250B in the three-dimensional real-world space. The device pose of the handheld device may be determined based on the one or more sensors associated with the handheld device using a simultaneous localization and mapping (SLAM) method (and/or outside-in tracking technology). The one or more sensors associated with the handheld device may include an acceleration sensor, a gyroscope, a proximity sensor, a light detection and ranging (LiDAR) scanner, or an inertial measurement unit (IMU). For example, the handheld device may use SLAM and back camera(s) to determine the accurate position of the phone with the surrounding environment. Then, the system may use face-tracking data of the handheld device to determine the head pose of fifth user 205B. The face-tracking data may be generated based on one or more facial recognition sensors, a light detection and ranging (LiDAR) scanner, and/or one or more cameras associated with the hand-held device. The head pose of the fifth user 250B may include a head position, a head tilting angle, and a face direction in the three-dimensional real-world space where the fifth user 250B is located. The head pose of the fifth user 250B may be with respect to the handheld device 251. After that, the system may combine the device pose of the handheld device and the head pose of the fifth user 250B to determine the absolute head pose of the fifth user 250B within the three-dimensional real-world space. The head pose of the user 250B may be determined in real-time while the fifth user moves around or keep static in the real-world space.

In particular embodiments, if the face-tracking mechanism (e.g., the front camera) can no longer detect the user's face for a period of time (e.g., the mobile phone falls off the user's hand), the system may not have the real-time face-tracking data anymore. In such situation, if the time period during which the face-tracking data is lost is shorter than a threshold duration, the system may keep the current avatar body pose in the virtual world to stay the same as the last moment before the face-tracking data is lost. The user can still interact (e.g., by talking with other users) but the avatar may not change its body pose. Once the face-tracking mechanism re-captures the user's face, the system may resume in updating the avatar body pose to reflect the user's body pose. Alternatively, the system may assume the relative position of the handheld device and the user's face does not change during the time period when the face-tracking data is lost and continue to render the avatar of the user based on the current device pose and the last moment head pose of the user. The perspective of a scene that a user can see in the virtual world may depend on the user's head pose (position and orientation). In particular embodiments, the system may use face-tracking to determine the user's head pose in real time and render the scene to the user based on the user's real-time head pose. In particular embodiments, the system may, based on the historical face-tracking data, predict the user's head pose in a future time moment and render the scene to the user based on the predicted user head pose for that time moment, factoring in the time period needed to render such scene. If the face-tracking data is lost for a period of time that is longer than a threshold and the handheld device changes its position dramatically (e.g., greater than a threshold distance), the system may make the avatar disappear from its original position and make it re-appear in the new position. In particular embodiments, the system may use a transactional visual effect to make the avatar disappear and reappear in the virtual space.

In particular embodiments, the front cam may be used for face tracking and the back cam may be used for both SLAM and the hand tracking. If the user's hands reach behind the phone, the back camera may also track the hand positions and movements in addition to SLAM. In particular embodiments, both back and front cameras may be used for tracking hands and/or face of the user. For example, when the user's hand is behind the handheld device, the back camera may be used to track the hand position and movement. When the user's hand is in front the handheld device, the front camera may be used to track the hand position and movement. When the user's hand falls beyond the FoVs of the back and front cameras, the system may freeze the avatar's hand position temporally and may resume to update the hand position of the avatar after the user's hand moves back to FoV of the back or front camera.

As shown in FIGS. 2E and 2F, the system may render an avatar 250A for the fifth user 250B after the fifth user 250B has joined the virtual board game through the handheld device 251. Because the fifth user 250B is located within the same meeting room with the first user 210B and the second user 220B, the system may position the avatar 250A based on the real-world position of the fifth user 250B within the meeting room with respect to the first user 210B and the second user 220B. The position of the fifth user 250B may be determined based on the device pose of the handheld device 251 and the head pose of the fifth user 250B as determined by the facing-tracking data. Similar to the avatars 210A and 220A of the first and second user 210B and 220B, the system may overlay the avatar 250A to the real-world person of the fifth user 250B in the augmented reality scene. The first and second users 210B and 220B in the same meeting room may see the avatar 250A overlaid on the real person of the fifth user 250B or slightly in front of the real person of the fifth user 250B. The third and fourth users 230B and 240B who join the virtual board game from respective remote locations may only see the avatars but not the real persons of the first, second, and fifth users 210B, 220B, and 250B.

In particular embodiments, the system may render the avatar 250A for the fifth user 250B who joins the virtual game through the handheld device 251 in a manner that the avatar 250A only partially follows or mirror the actual body pose of the fifth user 250B. In particular embodiments, a first body part of the avatar 250A in the virtual space may have a same pose with a corresponding first body part of the fifth user 250B in the real-world space, while a second body part of the avatar 250A in the virtual space may a distinct pose with a corresponding second body part of the fifth user 250B in the real-world space. The first body part of the avatar 250A that has the same pose with the corresponding first body part of the fifth user 250B in the real-world space may include a first arm of the fifth user 250B which is not used for holding the handheld device 251. Because this arm is not used to hold the handheld device 251, the fifth user 250B may freely use move this arm to interact with virtual objects or other users in the metaverse. For this arm and associated hand, the system may keep the avatar 250A to be consistent with the real person of the fifth user 250B in the real world.

However, the fifth user 250B may held the handheld device 251 in the one hand and with the that arm extending forward all the time, as shown in FIG. 2E. Mirroring such arm pose may provide less optimal user experience because it will be awkward to other users to see the fifth user 250B having his arm extended forward all the time in the metaverse. Furthermore, other users may infer, from the awkward body posture, that this fifth user 250 must be using a handheld device rather than headsets. To solve this problem, the system may render the avatar 250A of the fifth user 250B to have a second body part having a distinct pose with a corresponding second body part of the fifth user 250B in the real-world space. For example, the user 250B may hold the handheld device 251 in his right hand with this arm extending forward. However, the avatar 250A may have its right hand and right arm down in a nature position. In other words, the system may render the avatar 250A to have both arms and hand positioned in a more natural way (e.g., both arms down as shown in FIG. 2F) regardless of whether they extend forward to hold the handheld device in the real world. For the hand and arm used to hold the handheld derive, the avatar 250A may have a distinct pose with the real person of the fifth user 250B in the real world. Because all avatars are rendered in a more natural body poses, users in the metaverse may not be able to tell which user is using a headset and which user is using a handheld device in joining the metaverse. This provides a more natural and optimal user experience for other users viewing the avatar 250A and protects the privacy of the users who use handheld devices to join the metaverse.

Figure 2G:
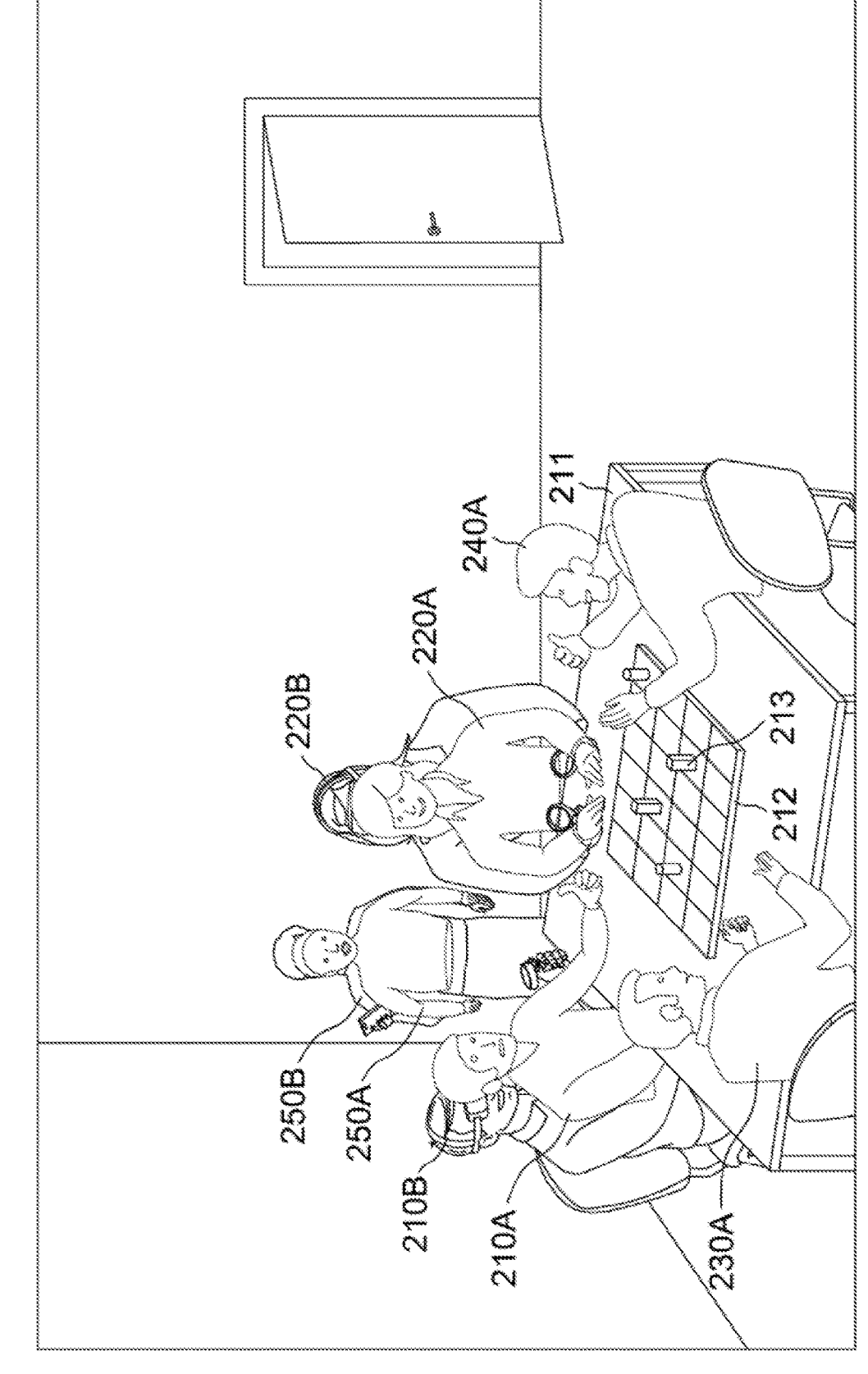
FIG. 2G illustrates an example scene where the avatar of a fifth user moves around in the game scene while the fifth user moves in the real-world space.

FIG. 2G illustrates an example scene 200G where the avatar 250A of a fifth user 250B moves around in the game scene while the fifth user 250B moves in the real-world space. When the fifth user 250B moves around in the real-world space (e.g., the meeting room shared with the first and second users 210B and 220B, the avatar 250B may follow the movement of the fifth user 250B in the virtual game scene while keeping both arms and hand in the more natural poses (e.g., the avatar having both arm down while the fifth user 250 extends one arm forward to hold the handheld device in his hand) while walking around. The avatar 250A may be rendered at the same position (e.g., overlaid) to the real person of the fifth user 250B as an avatar in an augmented reality scene. In particular embodiments, the avatar 250A may be rendered at a position that is slightly in front of the real person of the fifth user 250B.

In particular embodiments, the system may allow the fifth user 250B who join the virtual board game through a handheld device to interact with one or more virtual objects and/or other users using his hands or other body parts. In particular embodiments, the system may track the positions and movements of the hands and arms of the fifth user 250B using object tracking sensors and/or cameras associated with the handheld device. For example, the handheld device 251 may include a front camera and a back-facing camera. In this example, while the fifth user 250B holds the handheld device 251 using this right hand, the left hand of the fifth user 250B may move around his body in the real-world space. When his left hand and arm extend behind the handheld device, the handheld device 251 may use the back-facing camera to track the left hand and arm of the fifth user 250B to determine their positions and movements. When his left hand and arm are in front of the handheld device 251, the handheld device 251 may use the front camera to track the position and movement of this hand and arm to determine their positions and movements. In either case, the handheld device may accurately determine the positions and movements of the user's hand and arm. Then, the system may determine the relative position and distance of the user's hand with respect to one or more virtual objects (e.g., a virtual game piece) to allow the user to interact with these virtual objects. In particular embodiments, the hand tracking may be based on camera data, LiDAR data, or other motion tracking sensors associated with the handheld device. While the handheld device 251 tracks the user's hand, arm, and head to determine their pose in real-time, the system may use such information to render an avatar for the fifth user 250B in the metaverse to reflect such hand pose, arm pose, and head pose in real-time. For example, the fifth user 250B may extend his left arm behind the handheld device 251 held in his right hand and use his left hand to pick up a virtual game piece and put it at another location on the virtual game board. During this process, the back camera of the handheld device may be used to track the hand position and movement of the user's left hand in real-time to allow the system to determine its relative position and distance to the virtual game piece. As another example, the fifth user 250B may wave his left hand while holding the handheld device in his right hand. The front camera of the handheld device may be used to track the position and movement of the user's left hand in real-time and allow the system to cause his avatar to wave the left hand in the real-time to interact with other users in the metaverse. In particular embodiments, the handheld device user may use the touch-screen and/or one or more buttons of the handheld device to interact with the virtual objects, rather than using hand gestures as described above. For example, a user may move a game piece by dragging the virtually rendered game piece by interacting with the touch screen of the handheld device. In the meantime, all other players may observe such inter-action by one of the following effects: (1) the game piece suddenly jumps/teleports/moves from one place on the board game to the final location; or (2) the system simulates a grabbing interaction for the handheld device user and the virtual avatar is rendered in a way that the virtual avatar grabs the game pieces with a hand, lifts it, and moves it to the final location (although the handheld device user did not actually move his hand in such a way but chose the inter-action only on the touch screen instead).

In particular embodiments, the handheld device may be mounted on a tripod or stand, and the user may have both hands free to move in the 3D space. The system may use the cameras and sensors associated with the handheld device to track the positions and movement of both hands of the users to interact with virtual objects or other users in the meta-verse. The front cameras, back cameras, and/or other sensors of the handheld device may be used in tracking the hand positions and movements in the 3D space. When one or more hands of the user move cross the field of views (FOVs) of the front and back cameras, there may be a short period of time that the user's hands do not fall within any FOVs of any cameras. For that short period of time, the system may keep the avatar body pose the same as the last moment before the hand tracking data is lost. In particular embodi-ments, the handheld device user may use the touch screen of the handheld device to interact with any virtual objects in the virtual space.

In particular embodiments, an artificial reality user wear-ing a headset may have its avatar rendered in the metaverse and that avatar may be viewable to other users. Unless the user looks down at himself, the user himself normally sees only a portion of his own full avatar such as his hands, arms, etc. As discussed earlier, for the augmented reality users, the system may overlay the user's avatar to the real person in the augmented reality scene. As such, the use may see the hands and arm of his own avatar overlaid on his real hands and arms. In particular embodiments, for the augmented reality user wearing a headset, the user may be able to use his real hands/arms and virtual hands/arms overlaid on the real hands/arms at the same time. In particular embodiments, for the virtual reality user wearing a headset, the user may only see his virtual hands/arms but not his real hands/arms in the virtual reality scene of the metaverse. In particular embodi-ments, the virtual hands/fingers are not simply overlayed on the real hands/fingers but may be used as occluders to allow for a natural interaction with virtual objects like game pieces. The occlusion may be realized by, for example, first rendering the virtual avatar/arms/hands into the z-buffer but not into the color buffer. After that, when normally rendering the virtual objects like game pieces (while using the same z-buffer), some parts of the virtual objects may not show up in the final rendering results. For example, when a real thumb occluding a part of the virtual game piece, that part of the virtual game may not show up in the final rendering results, enabling a more realistic virtual effect.

In particular embodiments, for the handheld device user and when the user extend his one arm and hand behind the handheld device (white the other hand hold the handheld device with screen facing the user's face), the system may use the back camera to track the user's arm and hand extending behind the handheld device. At the same time, the system may display the user's arm and hand as captured by the back camera on the display of the handheld device. As such, when the user looks at the display of the handheld device to see the augmented reality scene (e.g., the virtual board game), the user may see his own arm and hand as captured by the back camera of the handheld device in real-time. Because the virtual objects like the virtual game pieces have been rendered and displayed on the display of the handheld device, the user may see his own real arm and hand, and the virtual objects in real-time to interact with the virtual objects (e.g., picking up a virtual game piece and place it at a different location on the virtual game board).

In particular embodiments, the system may only display, on the display of the handheld device, the user's virtual arm and hand when his real arm and hand extends behind the handheld device. Because for the arm and hand that extends behind the handheld device, the corresponding virtual arm and hand may minor the position and movement of the user's real arm and hand in real-time. As such, the virtual arm and hand displayed on the display of the handheld device may provide effective visual feedback to the user to interact with virtual objects or other users in real-time. The user may look at his virtual arm and hand on the display of the handheld device to effectively manipulate this real arm and hand to interact with virtual objects and other users. In particular embodiments, the system may display both the real arm/hand and the virtual arm/hand of the handheld device user on the display of the handheld device with the virtual arm/hand being overlaid on the real arm/hand, with the position and movement of the virtual arm/hand mirroring the real arm/hand in the real-time.

To other users in the same virtual session of the metaverse, if these users are not located at the same location with the handheld device user, the system may only render the avatar of the handheld device user in the virtual environment. To these remote users, whether they are virtual reality user or augmented reality users, they may only see the avatar of the handheld device user and may not be able to see the real person of the handheld device user. However, to the users that are located with the same physical location with the handheld device user, these users may see both the real person of the handheld device user (as the background of the augmented reality scene) and the avatar of the handheld device user, if they are augmented reality users. However, if they choose to be virtual reality users, they may not be able to see the real person of the handheld device user even if they are physically at the same location with the handheld device user. Regardless of whether other users are at the same physical location with the handheld device user and whether they choose virtual reality or augmented reality modes, other users may see the avatar of the handheld device user that is partially consistent with the real person's body pose of the handheld device user. In other words, other body parts (e.g., the arm/hand extend to interact with virtual objects or other users) of the avatar may be consistent with the real person of the handheld device user, while some other body parts of the avatar may have a distinct pose with the corresponding body part of the real person of the handheld device user (e.g., the arm and hand holding the handheld device extends front in the real world but the avatar will have this arm and hand down in a natural position). In particular embodiments, the virtual board game may have real game pieces in front of the user. The system may use the real game pieces to determine the position of the phone in relative to the board game. With the real game pieces, the user's real hand may be displayed on the phone screen to move the real game pieces. With virtual game pieces, the display screen may display a virtual hand to move the virtual game pieces.

Figure 3A:
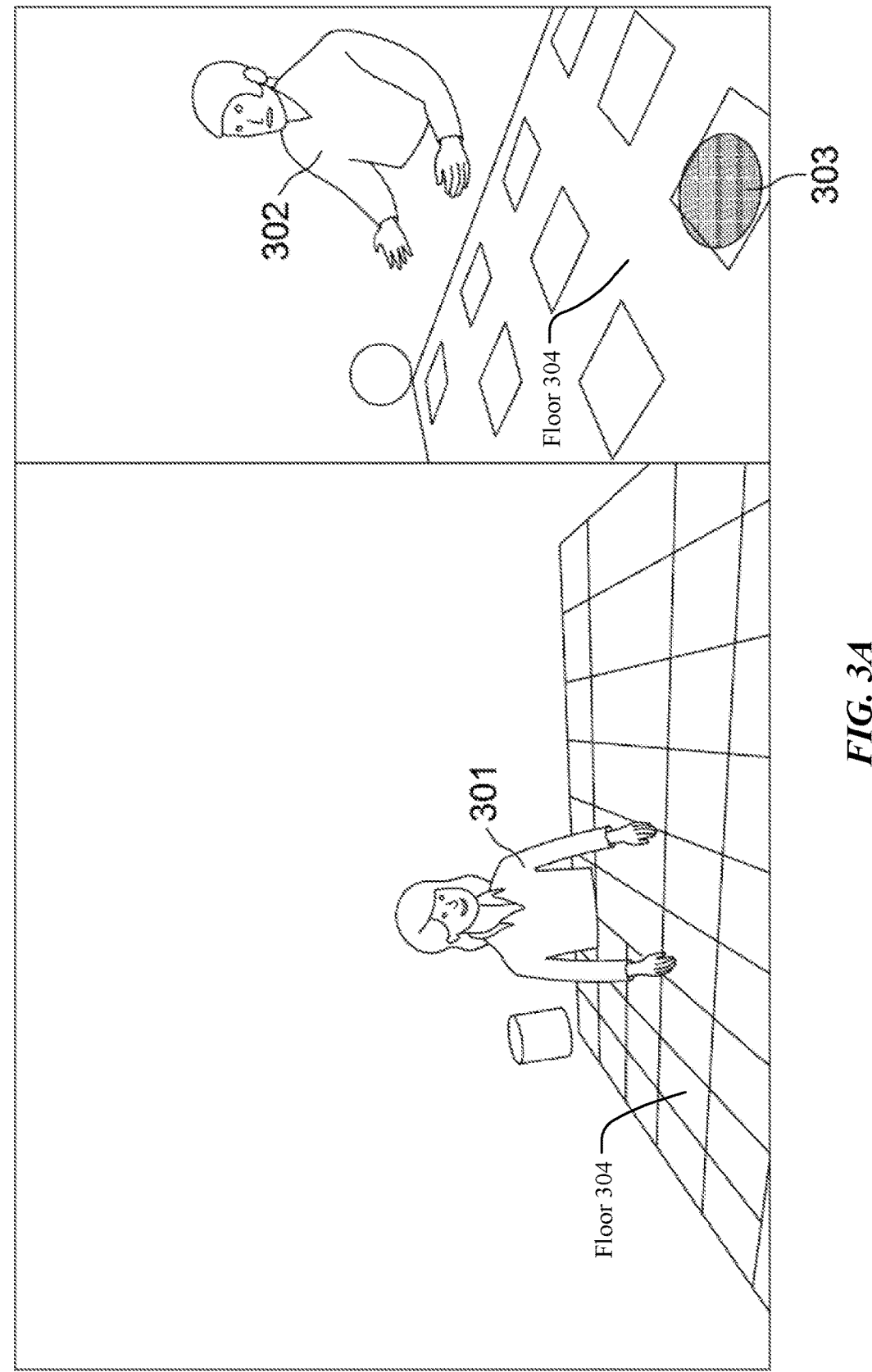
FIG. 3A illustrates an example virtual scene including an avatar having a shadow to provide a visual cue for the avatar's position.
Figure 3B:
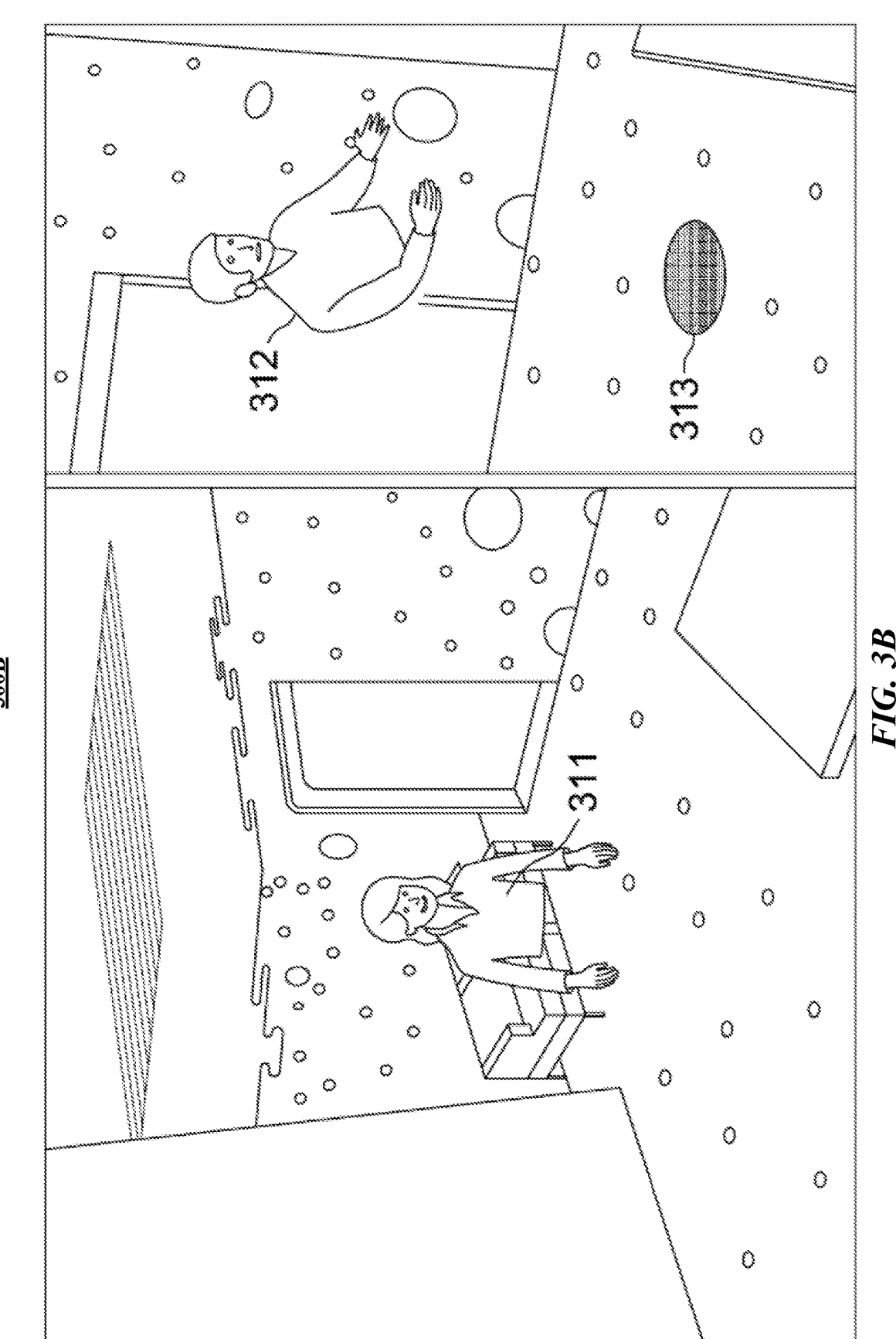
FIG. 3B illustrate another example virtual scene including an avatar having a shadow to provide a visual cue for the avatar's position.

FIG. 3A illustrates an example virtual scene 300A including an avatar 302 having a shadow 303 to provide a visual cue for the avatar's position. FIG. 3B illustrate another example virtual scene 300B including an avatar 312 having a shadow 313 to provide a visual cue for the avatar's position. In particular embodiments, the avatar rendered for a user in the metaverse may not include the body portion under the waist (in other words, the avatar only includes the body portion above the waist). Because the avatar does not include legs and feet, it may be not apparent to other users where an avatar is located on a virtual floor (virtual reality) or a real-world floor (augmented reality). If the handheld device user sees a pure virtual scene, the shadow may be rendered by the virtual display engine. If the handheld device shows real room with an avatar standing in the virtual space, the shadow for that object may be on the real-world ground to provide clue where the object is located.

In particular embodiments, one or more users may join the same virtual session (e.g., a virtual game) in the metaverse using different devices. For example, the avatars 301 and 311 may each be associated with a handheld device user who joins the virtual session through a handheld device rather than a headset. The avatars 302 and 312 may each be associated with a headset user who joins the virtual session through wearing a headset. For the headset user, the virtual reality scene 300A or 300B may be rendered and displayed through the head mounted display (HMD) of the headset. The HMD may have two displays (one for each eye) which can allow the user to view a scene using a stereo view (e.g., using both eyes) to perceive the depth of the scene. For example, the headset user may be able to perceive a distance of a virtual object or avatar based on its size and shape as viewed by the headset user because he can perceive the depth information. However, for the handheld device user, the virtual objects and avatars may be displayed on the display of the handheld device, which is normally a two-dimensional screen. The handheld device user may not be able to perceive the depth information because he does not have the stereo view from the 2D screen display. As such, the handheld device user may face difficult in perceiving the depth information in the virtual scene.

To solve this problem, the system may render a shadow for each avatar and one or more virtual objects (e.g., game pieces) in the virtual scene to provide visual cue for the handheld device user. For example, the avatars 301 and 302 may be within the same virtual session in the metaverse and positioned on the same virtual floor 304, which may be mapped to the respective physical floors for the two users. The avatar 301, which is associated with a handheld device user, may be directly rendered in the virtual space and viewable to the other user through the headset. Because the headset user can perceive depth information of the virtual scene through the stereo view, the system may not need to render a shadow for the avatar. In contrast, the avatar 302, which is associated with a headset user or another handheld device user, may need to be rendered and displayed on the display of the handheld device, which is a two-dimensional screen that does not provide a stereo view. As such, the system may render a shadow 303 for the avatar 302. The shadow 303 may have a number of shadow parameters including, for example, but not limited to, a position on the virtual floor, a relative position to the objects (e.g., virtual objects or real objects), a size, a shape (e.g., a round shape, an oval shape, a deformed round shape), a projection angle, etc. These shadow parameters may be determined based on the actual position, the size, and shape of the avatar 302 and may provide an effective visual cue for the handheld device user to perceive the depth, the distance, or the size information of the avatar 302. It is notable that, the avatar 302 can be associated with a headset user or another handheld device user. As long as an avatar is to be rendered and displayed in a two-dimensional display, the system may render and display a shadow to provide the visual cue for the handheld device user.

As another example, the avatars 311 and 312 may be within the same virtual session in the metaverse and positioned on the same virtual floor 314, which may be mapped to the respective physical floors for the two users. The avatar 311, which is associated with a handheld device user, may be directly rendered in the virtual space and viewable to the other user through the headset. Because the headset user can perceive depth information of the virtual scene through the stereo view, the system may not need to render a shadow for the avatar. In contrast, the avatar 312, which is associated with a headset user or another handheld device user, and other virtual objects (e.g., a game piece) may need to be rendered and displayed on the display of the handheld device, which is a two-dimensional screen that does not provide a stereo view. As such, the system may render a shadow 313 for the avatar 312. The shadow 313 may have a number of shadow parameters including, for example, but not limited to, a position on the virtual floor, a relative position to the objects (e.g., virtual objects or real objects), a size, a shape (e.g., a round shape, an oval shape, a deformed round shape), a projection angle, etc. These shadow parameters may be determined based on the actual position, the size, and shape of the avatar 312 and may provide an effective visual cue for the handheld device user to perceive the depth, the distance, or the size information of the avatar 312. It is notable that, the avatar 312 can be associated with a headset user or another handheld device user. As long as an avatar is to be rendered and displayed in a two-dimensional display, the system may render and display a shadow to provide the visual cue for the handheld device user.

In particular embodiments, the system may render a shadow for each virtual object that the handheld device user might interact or is interacting with to provide a visual cue for the handheld device user. For example, when the handheld device user picks up a virtual game piece and moves it to a different position on the game board, the system may render a shadow for the game piece following the game piece to provide a visual cue for the handheld user regarding the real-time position of the game piece with respect to other real or virtual objects. As another example, the system may render a shadow for each virtual game piece that the handheld device user may pick and move to provide a visual clue for the handheld device user to easily reach that virtual game piece. The system may not need to render a shadow for the game board because the game board is positioned directly on the surface of the table. However, if the handheld device user picks up the virtual game board and moves it to a different position (e.g., from a table to ground), the system may also render a shadow for the virtual game board to provide a virtual cue for the handheld device user.

FIG. 4 illustrates an example method 400 of rendering an avatar in the metaverse for a user joining the metaverse through a handheld device. The method may begin at step 410, where a computing system may determine a device pose of a handheld device in a real-world space based on one or more sensors associated with the handheld device. At step 420, the system may determine a head pose of a first user associated with the handheld device based on face-tracking data of the handheld device, the head pose being with respect to the handheld device in the real-world space. At step 430, the system may render a first avatar associated with the first user in a virtual space based on the head pose of the first user in the real-world space. At step 440, the system may render one or more virtual objects in the virtual space to the first user based on the head pose of the first user in the real-world space.

In particular embodiments, a first body part of the first avatar in the virtual space may have a same pose with a corresponding first body part of the first user in the real-world space, while a second body part of the first avatar in the virtual space may have a distinct pose with a corresponding second body part of the first user in the real-world space. In particular embodiments, the first body part of the first avatar that has the same pose with the corresponding first body part of the first user in the real-world space may include a first arm of the first user while the handheld device is held in a hand of the first user associated with a second arm of the first user. In particular embodiments, the second body part of the first avatar that has a distinct pose with a corresponding second body part of the user in the real-world space may include the second arm of the user associated with the hand holding the handheld device.

In particular embodiments, the first user may be located at a first physical location in the real-world space while a second user may be located in a second physical location different from the first physical location in the real-world space. The system may further render a second avatar associated with the second user in the virtual space to the first user. The second avatar may be positioned on a first real floor at the first physical location where the first user is located. In particular embodiments, the system may render a shadow for the second avatar associated with the second user in the virtual space. The shadow of the second avatar may be positioned on the first real floor at the first physical location where the first user is located. In particular embodiments, one or more parameters of the shadow of the second avatar associated with the second user may be determined based on a relative position of the second avatar associated with the second user with respect to the first avatar associated with the first user in the virtual space, and wherein the one or more parameters of the shadow may include a shadow size, a shadow shape, and a shadow position.

In particular embodiments, the shadow of the second avatar associated with the second user may provide a visual cue to the first user regarding the relative position of the second user in the virtual world with respect to the first avatar associated with the first user and the one or more virtual objects. In particular embodiments, the first avatar associated with the first user may be rendered in the virtual space on a virtual floor that is aligned with a second real-world floor at the second physical location where the second user is located. In particular embodiments, a third user may be located at the same physical location where the first user is located, and wherein the third user may wear an artificial reality headset. In particular embodiments, the system may render a third avatar associated with third user in the virtual space to the first user. The third avatar associated with the third user may be positioned on the first real-world floor at the first physical location where the first user and the third user are located. In particular embodiments, the third avatar associated with the third person may be positioned on the first real-world floor according to a relative position of the third user with respect to the first user. In particular embodiments, the third avatar associated with the third person may be positioned on the first real-world floor according to a relative position of the third user with respect to an anchoring object on the first real-world floor.

In particular embodiments, the anchoring object may be a real-world game board shared by the first user and the third user in a virtual game. The one or more virtual objects in the virtual space may include one or more virtual game pieces positioned on the real-world game board. In particular embodiments, the third avatar in the virtual space may be overlaid to the third user in the real-world space and may follow the third user's body pose. The first avatar associated with the first user may be overlaid to the first user in the real-world space. The first avatar associated with the first user may follow the first user's position when the first user moves in the real-world space. In particular embodiments, the device pose of the handheld device may be determined based on the one or more sensors associated with the handheld device using a simultaneous localization and mapping (SLAM) method and/or outside-in tracking technology. The one or more sensors associated with the handheld device may include an acceleration sensor, a gyroscope, a proximity sensor, a light detection and ranging (LiDAR) scanner, or an inertial measurement unit (IMU). In particular embodiments, the facing-tracking data of the handheld device may be generated by one or more facial recognition sensors, a light detection and ranging (LiDAR) scanner, or one or more cameras. In particular embodiments, the one or more virtual objects may be rendered to the first user through a display associated with the handheld device.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method of rendering an avatar in the metaverse for a user joining the metaverse through a handheld device including the particular steps of the method of FIG. 4, this disclosure contemplates any suitable method of rendering an avatar in the metaverse for a user joining the metaverse through a handheld device including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, the handheld device or headsets may use one or more sensors or cameras to capture information related to the user and the surrounding environment. In particular embodiments, to protect the user's privacy, the system may use an ad-hoc alignment between several headsets without exchanging feature maps of the surrounding environment. All location data is handled locally on-device only. To do this, the system may use a pattern tracker where an openly available game board is used to register and align multiple devices across different locations. The pattern tracker may only use the information related to the open game board to align the artificial reality scenes of different users. No private information may be exchanged between devices used by different users for aligning the real and/or virtual objects for different users. Each user has total control on how the information about the user or the surrounding environment is shared with others through the privacy setting. This reduces friction to align multiple devices significantly when considering the system architecture and privacy.

In particular embodiments, one or more of the content objects of the metaverse may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the metaverse. Where the privacy settings for an object allow a particular user to access that object, the object may be described as being "visible" with respect to that user. As an example and not by way of limitation, a user of the metaverse may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular elements. Privacy settings may specify how the element, information associated with the metaverse, or content objects associated with the element can be accessed. As an example and not by way of limitation, a particular photo may have a privacy setting specifying that the photo may only be accessed by users tagged in the photo and their friends. In particular embodiments, privacy settings may allow users to opt in or opt out of having their actions logged by system or shared with other systems (e.g., third-party system). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, metaverse system may send a request to the data store for the object. The request may identify the user associated with the request and may only be sent to the user (or a client system of the user) if the authorization server determines that the user is authorized to access the object based on the privacy settings associated with the object. If the requesting user is not authorized to access the object, the authorization server may prevent the requested object from being retrieved from the data store, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, privacy settings may allow a user to engage in the ephemeral sharing of objects on the metaverse. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch. As another example and not by way of limitation, the system may store particular privacy policies/guidelines in the privacy settings associated with a user. The particular privacy policies/guidelines may specify that a particular video uploaded by the user is visible to the user's friends until the next day, after which time the video may no longer be accessible to other users. The system may further update the privacy policies/guidelines adaptively based on one or more machine-learning algorithms.

In particular embodiments, for particular objects or information having privacy settings specifying that they are ephemeral, the system may be restricted in its access, storage, or use of the objects or information. The system may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system may temporarily store the message in a data store until the second user has viewed or downloaded the message, at which point the system may delete the message from the data store. As another example and not by way of limitation, continuing with the prior example, the message may be stored for a specified period of time (e.g., 2 weeks), after which point the system may delete the message from the data store.

Figure 5:
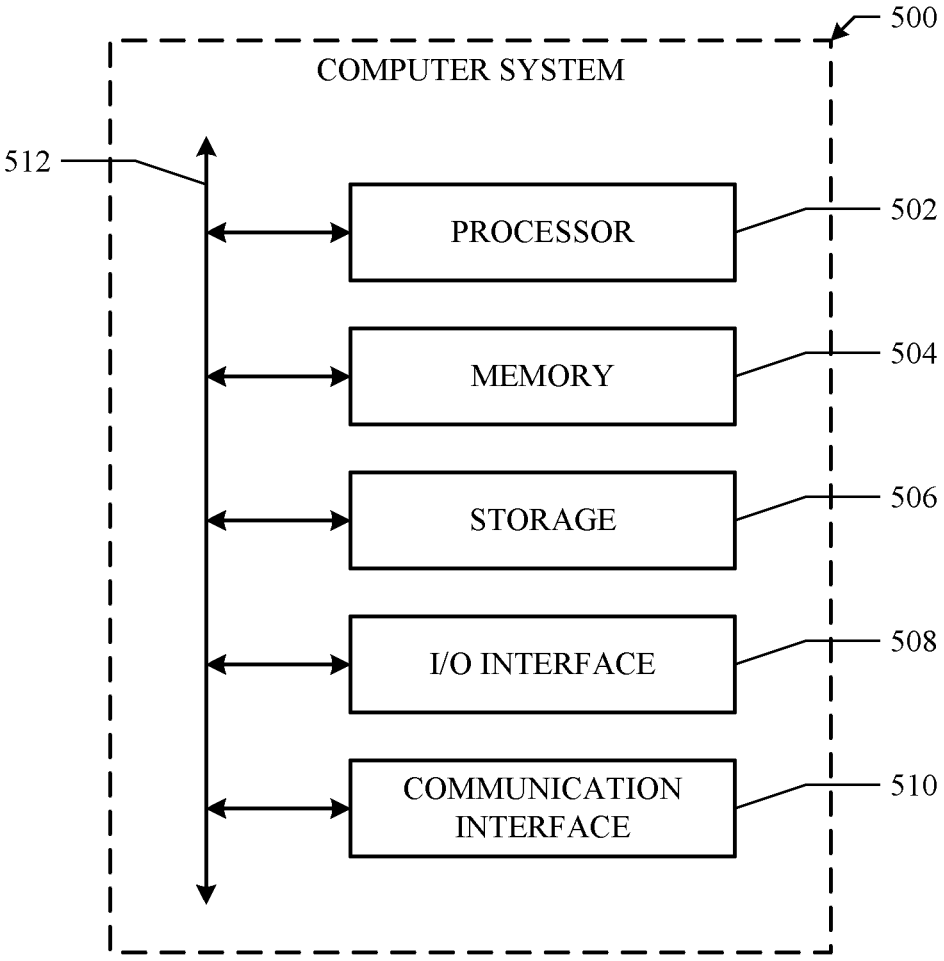
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining a device pose of a handheld device in a real-world space based on one or more sensors associated with the handheld device;
   determining a head pose of a first user associated with the handheld device based on face-tracking data of the handheld device, the head pose being with respect to the handheld device in the real-world space;
   rendering a first avatar associated with the first user in a virtual space based on the head pose of the first user in the real-world space, the rendering including:
      generating a representation of a first action performed by the first user, and
      refraining from generating an additional representation of a second action performed by the user, the second action being associated with a position of the handheld device in the real-world space; and
   rendering one or more virtual objects in the virtual space to the first user based on the head pose of the first user in the real-world space.

2. The method of claim 1, wherein a first body part of the first avatar in the virtual space has a same pose with a corresponding first body part of the first user in the real-world space, and wherein a second body part of the first avatar in the virtual space has a distinct pose with a corresponding second body part of the first user in the real-world space.

3. The method of claim 2, wherein the first body part of the first avatar that has the same pose with the corresponding first body part of the first user in the real-world space comprises a first arm of the first user, and wherein the handheld device is held in a hand of the first user associated with a second arm of the first user.

4. The method of claim 3, wherein the second body part of the first avatar that has a distinct pose with a corresponding second body part of the first user in the real-world space comprises the second arm of the first user associated with the hand holding the handheld device.

5. The method of claim 1, wherein the first user is located at a first physical location in the real-world space, and wherein a second user is located in a second physical location different from the first physical location in the real-world space, further comprising:
   rendering a second avatar associated with the second user in the virtual space to the first user, wherein the second avatar is positioned at the first physical location where the first user is located.

6. The method of claim 5, further comprising:
   rendering a first shadow for the second avatar associated with the second user in the virtual space, wherein the first shadow of the second avatar is positioned on a first real surface at the first physical location where the first user is located; and
   rendering a second shadow for a selected virtual object in the virtual space, wherein the second shadow of the selected virtual object is positioned on a second real surface at the first physical location.

7. The method of claim 6, wherein one or more parameters of the first shadow of the second avatar associated with the second user are determined based on a relative position of the second avatar associated with the second user with respect to the first avatar associated with the first user in the virtual space, and wherein the one or more parameters of the first shadow comprises a shadow size, a shadow shape, and a shadow position.

8. The method of claim 7, wherein the first shadow of the second avatar associated with the second user and the second shadow associated with the selected virtual object provide a visual cue to the first user regarding the relative position of the second user and the selected virtual object in the virtual space with respect to the first avatar associated with the first user and other virtual objects.

9. The method of claim 5, wherein the first avatar associated with the first user is rendered in the virtual space on a virtual surface that is aligned with a real-world surface at the second physical location where the second user is located.

10. The method of claim 5, wherein a third user is located at the same physical location where the first user is located, and wherein the third user wears an artificial reality headset.

11. The method of claim 10, further comprising:
   rendering a third avatar associated with third user in the virtual space to the first user, wherein the third avatar associated with the third user is positioned on a real-world surface at the first physical location where the first user and the third user are located.

12. The method of claim 11, wherein the third avatar associated with the third user is positioned on the real-world surface according to a relative position of the third user with respect to the first user.

13. The method of claim 11, wherein the third avatar associated with the third user is positioned on the real-world surface according to a relative position of the third user with respect to an anchoring object on the real-world surface.

14. The method of claim 13, wherein the anchoring object is a real-world game board shared by the first user and the third user in a virtual game, and wherein the one or more virtual objects in the virtual space comprises one or more virtual game pieces positioned on the real-world game board.

15. The method of claim 11, wherein the third avatar in the virtual space is overlaid to the third user in the real-world space and follows the third user's body pose, wherein the first avatar associated with the first user is overlaid to the first user in the real-world space, and wherein the first avatar associated with the first user follows the first user's position when the first user moves in the real-world space.

16. The method of claim 1, wherein the device pose of the handheld device is determined based on the one or more sensors associated with the handheld device using a simultaneous localization and mapping (SLAM) method, and wherein the one or more sensors associated with the handheld device comprise an acceleration sensor, a gyroscope, a proximity sensor, a light detection and ranging (LiDAR) scanner, or an inertial measurement unit (IMU).

17. The method of claim 1, wherein the face-tracking data of the handheld device is generated by one or more facial recognition sensors, a light detection and ranging (LiDAR) scanner, or one or more cameras.

18. The method of claim 1, wherein the one or more virtual objects are rendered to the first user through a display associated with the handheld device.

19. One or more computer-readable non-transitory storage media embodying software that is operable when executed to:

determine a device pose of a handheld device in a real-world space based on one or more sensors associated with the handheld device;

determine a head pose of a first user associated with the handheld device based on face-tracking data of the handheld device, the head pose being with respect to the handheld device in the real-world space;

render a first avatar associated with the first user in a virtual space based on the head pose of the first user in the real-world space, the rendering including:

generating a representation of a first action performed by the first user, and refraining from generating an additional representation of a second action performed by the user, the second action being associated with a position of the handheld device in the real-world space; and render one or more virtual objects in the virtual space to the first user based on the head pose of the first user in the real-world space.

20. A system comprising:

one or more non-transitory computer-readable storage media embodying instructions; and one or more processors coupled to the storage media and operable to execute the instructions to:

determining a device pose of a handheld device in a real-world space based on one or more sensors associated with the handheld device;

determining a head pose of a first user associated with the handheld device based on face-tracking data of the handheld device, the head pose being with respect to the handheld device in the real-world space;

rendering a first avatar associated with the first user in a virtual space based on the head pose of the first user in the real-world space, the rendering including:

generating a representation of a first action performed by the first user, and refraining from generating an additional representation of a second action performed by the user, the second action being associated with a position of the handheld device in the real-world space; and rendering one or more virtual objects in the virtual space to the first user based on the head pose of the first user in the real-world space.

* * * * *